US006373675B1

(12) United States Patent
Yamazaki et al.

(10) Patent No.: US 6,373,675 B1
(45) Date of Patent: Apr. 16, 2002

(54) OPERATING APPARATUS FOR SWITCHING DEVICE

(75) Inventors: Toshiharu Yamazaki, Yokohama; Kimiya Sato; Mitsutaka Homma, both of Tokorozawa; Yoshinobu Ishikawa, Hino; Makoto Taniguchi, Tokorozawa, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/482,640

(22) Filed: Jan. 13, 2000

(30) Foreign Application Priority Data

Jan. 14, 1999 (JP) .......................................... 11-007840
Jul. 12, 1999 (JP) .......................................... 11-197610

(51) Int. Cl.$^{7}$ ............................ H02H 3/08; H02H 1/00; H01H 3/00; H01H 33/38

(52) U.S. Cl. ...................... 361/135; 361/133; 361/115; 200/400; 200/237; 218/120; 218/142; 218/154

(58) Field of Search ................................ 361/632, 634, 361/652, 202, 115, 135, 133; 218/1, 7, 14, 48, 49, 57, 65, 78, 84, 92, 118, 120, 140, 154, 142; 200/400, 237, 250, 330, 337

(56) References Cited

U.S. PATENT DOCUMENTS 2,442,477 A * 6/1948 Wallace et al. ............... 200/89
3,656,022 A * 4/1972 Greenwood ............... 317/11 C
4,025,886 A * 5/1977 Barkan et al. .............. 335/195
4,030,055 A * 6/1977 Kotos ......................... 335/195
4,086,645 A * 4/1978 Gorman et al. ............. 361/155
4,421,961 A * 12/1983 Sakuma et al. ......... 200/144 B
5,321,221 A * 6/1994 Rozier ........................ 200/145
5,464,191 A * 11/1995 Shenk ................... 251/129.21
5,512,724 A * 4/1996 Binder et al. ............... 218/140
5,809,157 A * 9/1998 Grumazescu ............... 381/199
6,020,567 A 2/2000 Ishikawa et al.

FOREIGN PATENT DOCUMENTS

EP 0 174 239 3/1986
EP 0709867 A1 * 5/1996 .......... H01H/33/66
GB 2 297 429 9/1993
JP 8-124463 A * 5/1996 .......... H01H/33/66
JP 2000-299041 A * 10/2000 .......... H01H/33/66
WO WO 95/07542 3/1995

* cited by examiner

*Primary Examiner*—Leo P. Picard
*Assistant Examiner*—Anatoly Vortman
(74) *Attorney, Agent, or Firm*—Oblon, Spivak, McClelland, Maier & Neustadt, P.C.

(57) ABSTRACT

In a closing magnetic circuit, when a movable contact is in contact with a fixed contact and a switching device is closed, N and S poles of a permanent magnet attract the fixed member in a direction in which the movable contact is pressed against the fixed contact. In an opening magnetic circuit, when the movable contact is separated from the fixed contact and the switching device is open, one of the N and S poles of the permanent magnet attracts the fixed member in a direction in which the movable contact is separated from the fixed contact. An operating electromagnet winding increases and decreases the magnetism in the closing magnetic circuit and opening magnetic circuit. With this configuration, it is possible to realize an operating apparatus for a switching device using a simple mechanism and assure a stable operation by producing a great contact load.

19 Claims, 16 Drawing Sheets

OPERATING APPARATUS FOR SWITCHING DEVICE

BACKGROUND OF THE INVENTION

The present invention relates to an operating apparatus for a switching device, for example, a small-capacity vacuum circuit breaker.

A conventional operating apparatus for a small-capacity vacuum circuit breaker has a configuration as shown in FIGS. 1 and 2.

As shown in FIG. 1, a vacuum valve 53 is supported by the upper support 52 of a switchboard 51 provided on a truck. An operating rod 54 for operating the movable contact of the vacuum valve is coupled with an operating apparatus 57 provided in the switchboard 51 via an insulating rod 55 and a wiper spring 56 supported by a main shaft 69.

As shown in FIG. 2, the operating apparatus 57 stores the force of a motor 58 in springs (a closing spring 59 and an opening spring 60). Tripping catches (a closing catch 61 and a tripping catch 62), the operating apparatus 57 releases the stored energy and is coupled with the outside world via the wiper spring 56.

While in such an operating apparatus 57, energy is usually stored by the motor 58, it may be stored by engaging a hand lever (not shown) with the output shaft of the motor 58. Although the catches 61, 62 are normally released by the electromagnetic force of coils 65, 66 via paddles (a closing paddle 63 and a tripping paddle 64), they may be released by pressing buttons (a closing button 67 and an opening button 68) with a hand.

In such a conventional operating apparatus for a vacuum circuit breaker, however, the operating apparatus is composed of a large number of component parts and is therefore large in scale. For this reason, it is required to provide an operating apparatus which is simple in mechanism and capable of operating stably by obtaining a large contact load.

BRIEF SUMMARY OF THE INVENTION

Accordingly, it is an object of the present invention to provide an operating apparatus for a switching device which produces a large contact load with a simple mechanism and operates stably over a long stroke.

According to an aspect of the present invention, there is provided an operating apparatus for operating a switching device having a movable contact and a fixed contact so provided that they can contact each other and separate from each other, comprising: an operating rod which is fixed to the movable contact and is held such that the rod can move in a direction in which the movable contact makes into contact with or is separated from the fixed contact; a movable member which is connected to the operating rod such that the member can move relatively to the rod and the relative movement to the operating rod is limited to a specific movable range; a fixed member for holding the movable member such that the movable member can move; a first elastic member for acting the operating rod with respect to the movable member in the direction in which the movable contact is pressed against the fixed contact; a permanent magnet for attracting the movable member with respect to the fixed member; a closing magnetic circuit so constructed that, when the movable contact is in contact with the fixed contact and the switching device is closed, N and S poles of the permanent magnet attract the fixed member in the direction in which the movable contact is pressed against the fixed contact; an opening magnetic circuit so constructed that, when the movable contact is apart from the fixed contact and the switching device is open, at least one of the N and S poles of the permanent magnet attract the fixed member in the direction in which the movable contact is separated from the fixed contact; and an operating electromagnet for increasing and decreasing the magnetism in the closing magnetic circuit and the opening magnetic circuit.

The operating apparatus may further comprise a second elastic member for acting the movable member with respect to the fixed member in the direction in which the movable contact is separated from the fixed contact.

The operating apparatus may further comprise a third elastic member for acting the movable member with respect to the fixed member in the direction in which the movable contact is pressed against the fixed contact in an open position where the movable contact is apart from the fixed contact.

In the operating apparatus, if a reaction force that the operating rod exerts on the movable member by the action of the first elastic member is Fk1, a reaction force that the fixed member exerts on the movable member by the action of the second elastic member is Fk2, and the permanent-magnet-generated attracting force that the fixed member acts on the movable member is Fm, setting may be done in the movable range of the movable member such that the changing characteristic of Fk, or Fk1+Fk2, is almost equal to the changing characteristic of Fm.

In the operating apparatus, if a reaction force that the operating rod exerts on the movable member by the action of the first elastic member is Fk1, a reaction force that the fixed member exerts on the movable member by the action of the second elastic member is Fk2, a reaction force that the fixed member exerts on the movable member by the action of the third elastic member is Fk3, and the permanent-magnet-generated attracting force that the fixed member acts on the movable member is Fm, setting may be done in the movable range of the movable member such that the changing characteristic of Fk, or Fk1+Fk2+Fk3, is almost equal to the changing characteristic of Fm.

In the operating apparatus, setting may be done such that, when the movable contact is pressed against the fixed contact and the switching device is closed, an expression $Fk<Fm$ holds, and when the switching device is open, an expression $Fk>Fm$ holds.

In the operating apparatus, the operating electromagnet may be composed of a closing operating electromagnet located in the closing magnetic circuit and an opening operating electromagnet located in the opening magnetic circuit.

The operating apparatus may further comprise: a peep door which is provided in part of the opening magnetic circuit or the closing magnetic circuit, can be opened and closed freely, and allows the N and S magnetic poles of the permanent magnet to be peeped at; and a magnetic force short member which has such a size as can be inserted through the peed door and pressed against the N and S poles and is made of a permeability material.

In the operating apparatus, the peed door may also serve as the magnetic force short member.

In the operating apparatus, the opening magnetic circuit may be so constructed that, when the movable contact is apart from the fixed contact and the switching device is open, the N and S poles of the permanent magnet attract the fixed member in the direction in which the movable contact is separated from the fixed contact.

The operating apparatus may further comprise: a second elastic member for acting the movable member with respect to the fixed member in the direction in which the movable contact is separated from the fixed contact; and a third elastic member for acting the movable member with respect to the fixed member in the direction in which the movable contact is pressed against the fixed contact.

In the operating apparatus, if the reaction force that the operating rod exerts on the movable member by the action of the first elastic member is Fk1, the reaction force that the fixed member exerts on the movable member by the action of the second elastic member is Fk2, the reaction force that the fixed member exerts on the movable member by the action of the third elastic member is Fk3, and the permanent-magnet-generated attracting force that the fixed member acts on the movable member is Fm, setting may be done in the movable range of the movable member such that the changing characteristic of Fk, or Fk1+Fk2+Fk3, is almost equal to the changing characteristic of Fm.

In the operating apparatus, one of the N and S poles of the permanent magnet may be a part to increase a force of attraction or a force of repulsion so as to accelerate the movable member in a direction of motion in the movable range of the movable member.

In the operating apparatus, setting may be done such that, when the movable contact is pressed against the fixed contact and the switching device is closed, an expression Fk<Fm holds, and when the switching device is open, an expression Fk>Fm holds.

In the operating apparatus, attracting surfaces of the N and S poles of the closing magnetic circuit and the opening magnetic circuit may be placed in staggered fashion in the direction in which the movable member moves.

In the operating apparatus, a distance by which attracting surfaces of the N and S poles are staggered may be longer than or almost equal to a stroke in which the movable member moves.

In the operating apparatus, the closing magnetic circuit and/or the opening magnetic circuit may be so constructed that areas of attracting surfaces of the N and S poles are nearly equal.

In the operating apparatus, a density of magnetic flux created by the permanent magnet may be designed to come closer to a magnetic saturation staring point of a material at attracting surfaces of the closing magnetic circuit and/or the opening magnetic circuit in a state where the attracting surfaces has approached the fixed member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

Hereinafter, referring to the accompanying drawings, embodiments of the present invention will be explained.

First Embodiment

Figure 1:
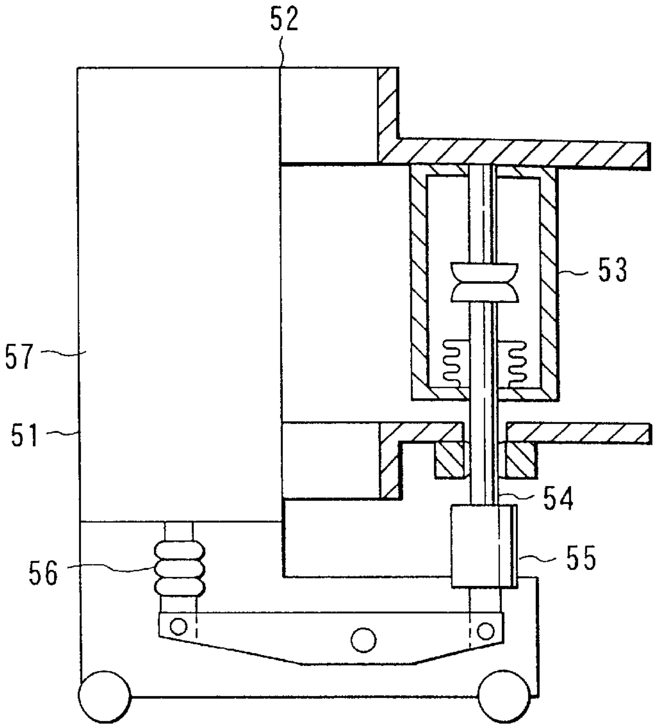
FIG. 1 (PRIOR ART)
FIG. 1 is a sectional view, partially in cross-section, of a conventional vacuum circuit breaker.
Figure 2:
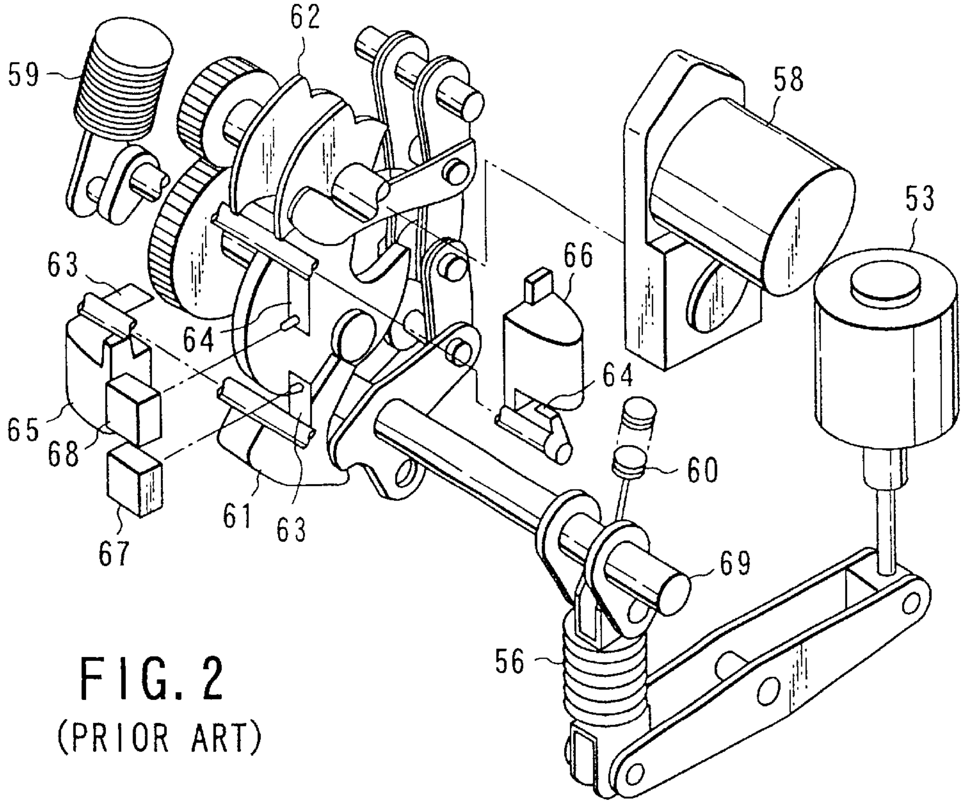
FIG. 2 (PRIOR ART)
FIG. 2 is a perspective view of an example of the operating apparatus in FIG. 1.
Figure 4:
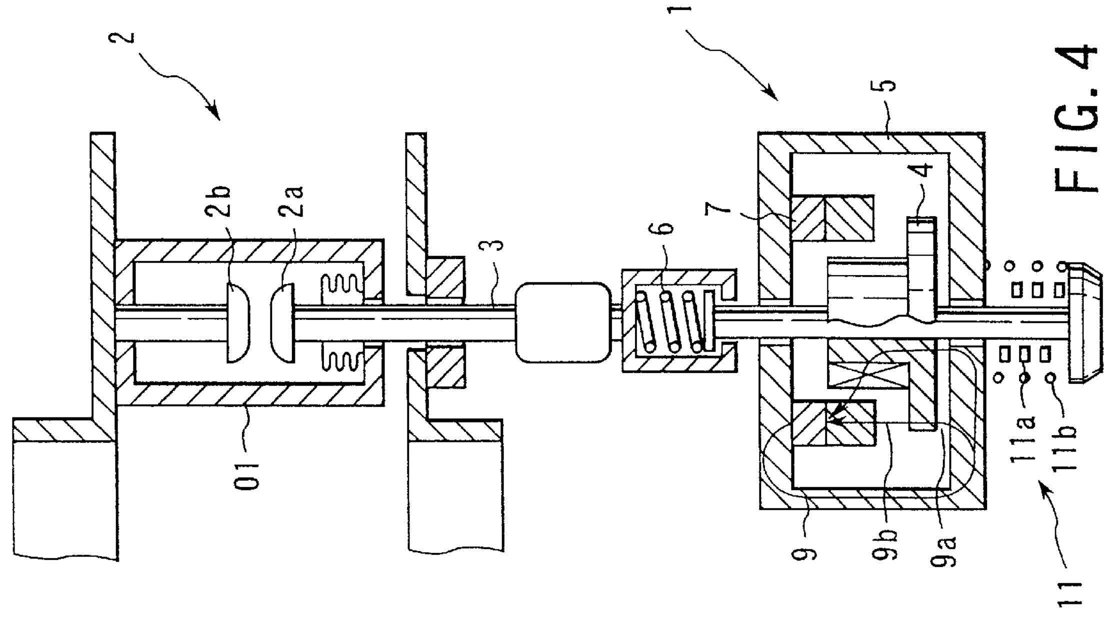
FIG. 4 is a sectional view showing the basic configuration of the first embodiment, with the switching device open.
Figure 3:
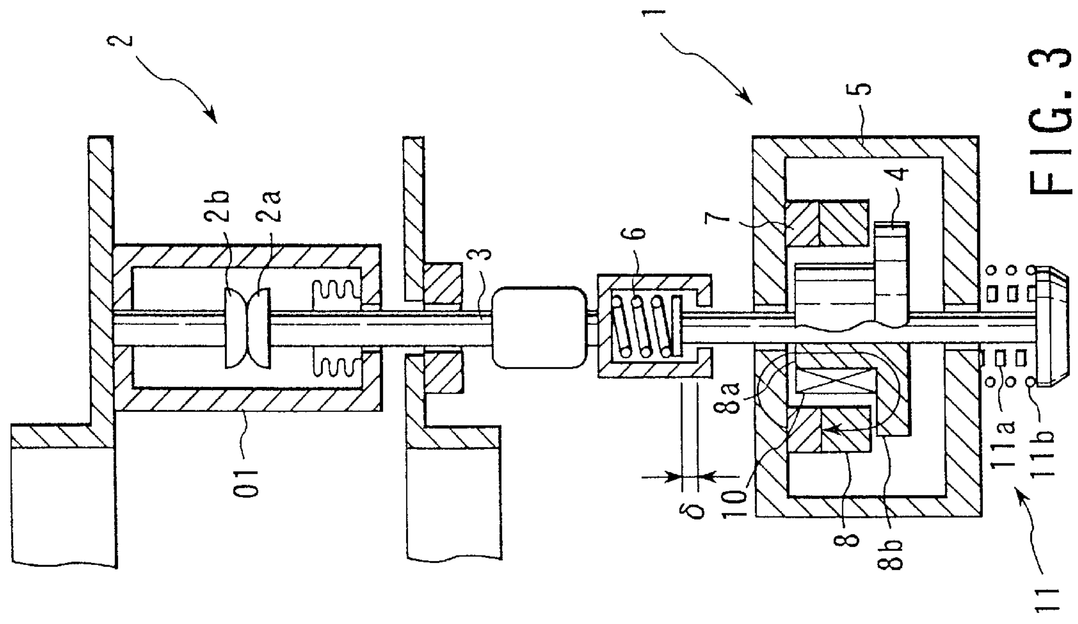
FIG. 3 is a sectional view showing the basic configuration of a first embodiment of the present invention, with the switching device closed.

FIGS. 3 and 4 are sectional views showing the basic configuration of an operating apparatus for a switching device according to a first embodiment of the present invention.

In FIG. 3, an operating apparatus 1 for operating a switching device (e.g., a switching device for opening and closing a vacuum circuit breaker) with a movable contact 2_a_ and a fixed contact 2_b_ provided in a vacuum container 01 in such a manner that the movable contact 2*a* can made contact with and separate from the fixed contact 2*b* is constructed as follows. An operating rod 3 is fixed to the movable container 2*a* and is held in such a manner that it can move up and down in the figure to cause the movable contact 2*a* to make contact with and separate from the fixed contact 2*b*.

A movable member 4 with a hat-shaped cross section is connected to the operating rod 3 in such a manner that it can move relatively. The relative movement to the operating rod 3 is restricted to a specific movable range δ. To hold the movable member 4 in such a manner that it can move up and down in the figure, a fixed member 5 with a cup-shaped cross section is provided.

There is provided a first elastic member 6 for acting the operating rod 3 with respect to the movable member 4 in the direction (upward in the figure) in which the movable contact 2*a* is pressed against the fixed contact 2*b*. A ringed permanent magnet 7 for attracting the movable member 4 with respect to the fixed member 5 is fixed to the fixed member 5. The permanent magnet 7 has the N-pole and S-pole magnetized at the opposite ends in the direction of shaft.

A closing magnetic circuit 8 is provided on the movable member 4 in such a manner that, when the movable contact 2*a* is in contact with the fixed contact 2*b* and the switching device 2 is closed, the incoming and outgoing magnetic fluxes 8*a*, 8*b* in the magnetic path of the N and S poles of the permanent magnet 7 attract the fixed member 5 in the direction in which the movable contact 2*a* is pressed against the fixed contact 2*b*.

In FIG. 4, there is provided a dust-box-shaped opening magnetic circuit (breaking magnetic circuit) 9 which is designed to enclose the hat-shaped movable member 4. The opening magnetic circuit 9 is so constructed that, when the movable contact 2*a* is apart from the fixed contact 2*b* and the switching device 2 is open (cut off), one pole 9*a* of the N and S poles of the permanent magnet 7 (the other pole 9*b* has a large gap) attracts the fixed member 5 in the direction in which the movable contact 2*a* is separated from the fixed contact 2*b*.

An operating electromagnet winding 10 is fixed to the movable member 4. An operating electromagnet composed of the movable member 4 and operating electromagnet winding 10 increases or decreases the magnetic flux (magnetic force) in the closing magnetic circuit 8 and opening magnetic circuit 9. In addition, there is provided a second elastic member 11 composed of a multistage spring, such as two stages of nonlinear springs 11*a* and 11*b*, to act the movable member 4 with respect to the fixed member 5 in the direction (downward in the figure) in which the movable contact 2*a* is separated from the fixed contact 2*b*.

As described above, with the first embodiment, although the configuration is simple with a smaller number of straight parts, the closing magnetic circuit 8 causes the N and S poles of the permanent magnet 7 to attract the fixed member 5 with multiple force in the direction in which the movable contact 2*a* is pressed against the fixed contact 2*b*, when the switching device 2 is closed. This produces a large contact load for the capacity of the magnet.

Furthermore, with the first embodiment, because even when the switching device 2 is open, the opening magnetic circuit 9 causes one of the N and S poles (one pole) to generate a force of attraction to some extent, it is possible to realize a stable operation without being affected by a little mechanical friction.

Figure 5A:
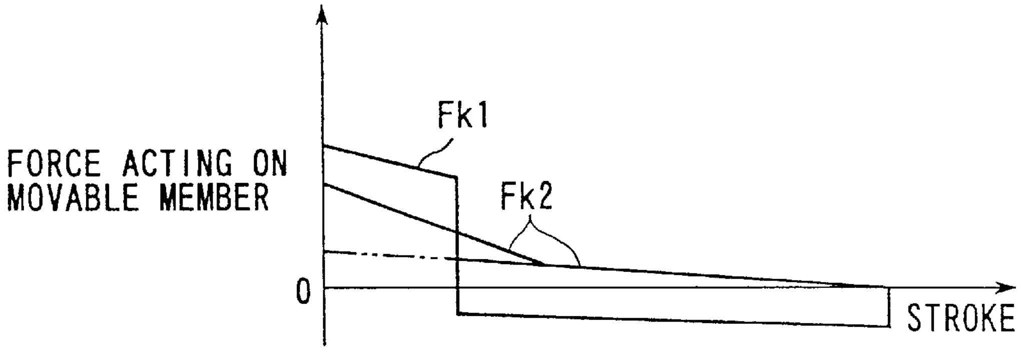
FIGS. 5A and 5B show the relationship between the stroke of the movable unit and the force applied to the unit in the first embodiment.

In addition, in FIG. 5A, if the reaction force (which includes the sum of the valve vacuum self-closing force of the switching device and the elastic restoring force of the bellows of the vacuum valve) that the operating rod 3 exerts on the movable member 4 by the action of the first elastic member 6 is Fk1, the reaction force that the fixed member 5 exerts on the movable member 4 by the action of the second elastic member 11 is Fk2, and the attracting force generated by the permanent magnet 7 that the fixed member 5 acts on the movable member 4 is Fm, setting is done in such a manner that, when the changing characteristic of Fk (=Fk1+Fk2) is almost equal to the changing characteristic of Fm and the switching device 2 is closed, the expression Fk<Fm holds, and when the switching device 2 is open, the expression Fk>Fm holds.

In FIGS. 6A to 6D, a peep door 12 through which the N and S poles of the permanent magnet 7 can be seen is provided at part of the opening magnetic circuit 9 in such a manner that the peep door can be opened and closed freely. The peep door 12 also serving as a magnetic force short member is made of a high-permeability iron or the like.

Figure 6A:
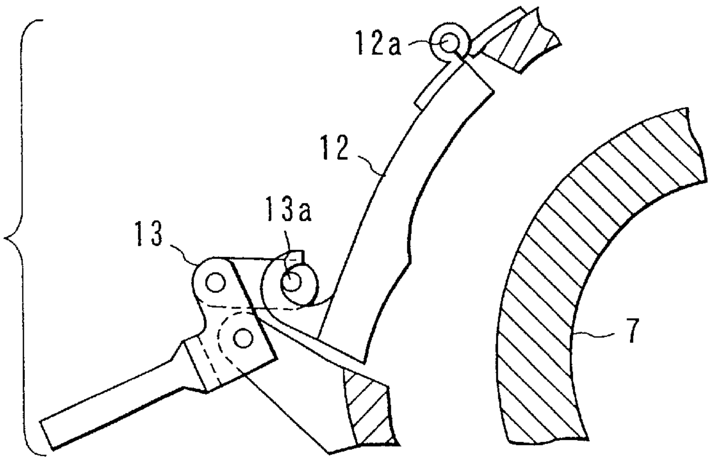
FIGS. 6A to 6D are views to help explain the mechanism of the magnetic force short member in the first embodiment.
Figure 6B:
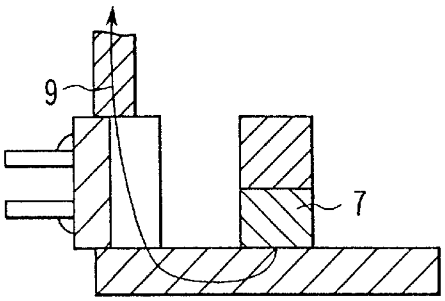
Figure 6C:
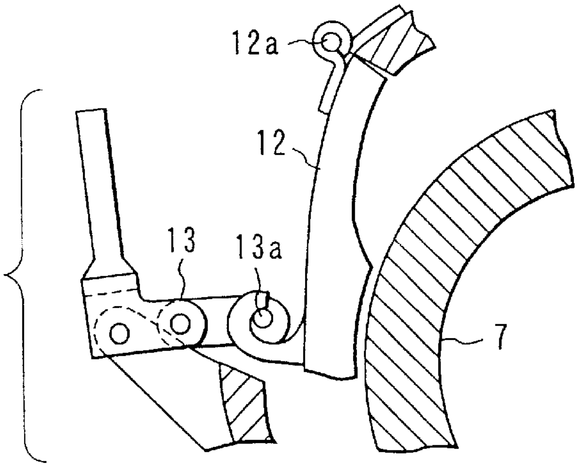
Figure 6D:
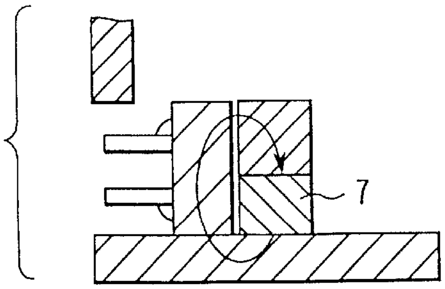

A hinge 12*a* pivotally supports one end of the peep door 12 in such a manner that, when the peep door 12 is opened, it rotates in a rocking manner and can be pressed against the N and S poles of the permanent magnet 7. The other end of the peep door 12 is fixed to a removable toggle link 13. The toggle link 13 and peep door 12 are easily attached and removed by inserting and removing a link pin 13*a*. FIGS. 6A and 6B are bottom views of the toggle link 13 and peep door 12 and FIGS. 6C and 6D are vertical sectional views of the toggle link 13 and peep door 12. FIGS. 6A and 6B show a normal state and FIGS. 6C and 6D show a state where the magnetic flux is short-circuited.

Next, the operation of the operating apparatus for a switching device according to the first embodiment will be explained by reference to FIGS. 3 to 8B. In FIG. 3, when the switching device 2 is closed, the incoming and outgoing fluxes 8*a* and 8*b* in the magnetic path of the N and S poles of the permanent magnet 7 in the closing magnetic circuit 8 attract the movable member 4 with the doubled force, opposing the forces created by the first elastic member 6 and second elastic member 11, which maintains the closed state.

In FIG. 4, when the switching device 2 is open, one magnetic path 9*a* of the N and S poles of the permanent magnet 7 in the opening magnetic circuit 9 attracts the movable member 4, thereby maintaining the open state. At this time, since the other magnetic path 9*b* has a large gap, the force of attraction created by one magnetic path 9*a* is so small that the opposite force of attraction created by the other magnetic path 9*b* can be neglected.

Figure 5B:
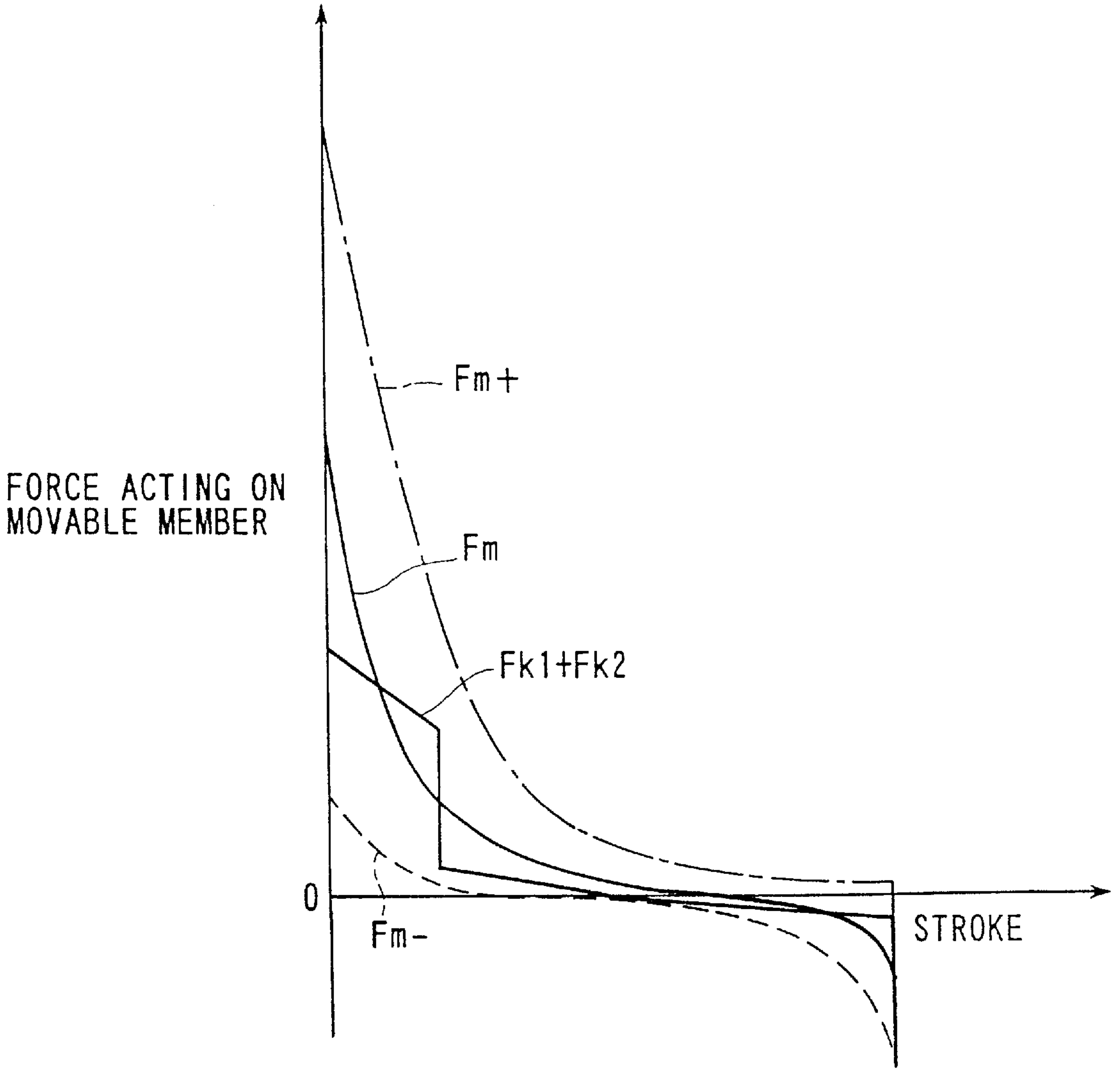

In FIG. 5B, the attracting force generated by the permanent magnet 7 that the fixed member 5 acts on the movable member 4 is represented as Fm.

Figure 7A:
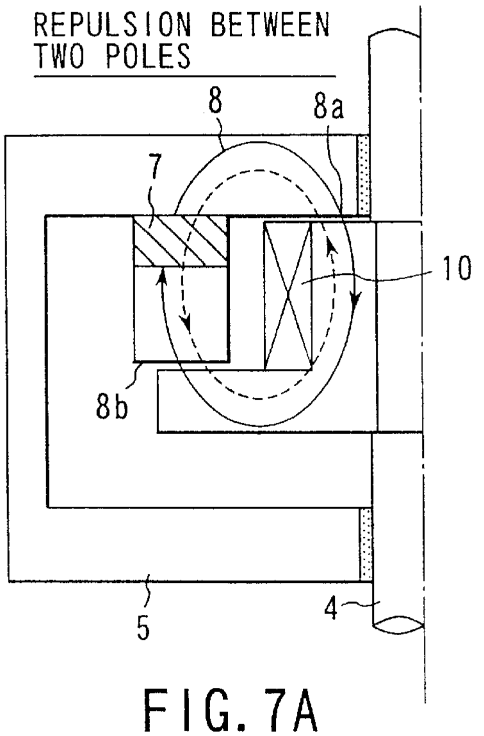
FIGS. 7A and 7B are views to help explain an opening operation in the first embodiment.

In FIGS. 3 and 4, the operating electromagnet winding 10 increases and decreases the magnetic force in the closing magnetic circuit 8 and opening magnetic circuit 9, thereby opening and closing the switching device 2. In FIG. 7A, with the switching device 2 closed, when the flux created by the operating electromagnet winding 10 (broken line) is caused to repel the flux (solid line) created by the permanent magnet 7, a decrease in the flux of the permanent magnet 7 allows the forces generated by the first elastic member 6 and second elastic member 11 to act the movable member 4 with respect to the fixed member 5 in the direction in which the movable contact 2*a* is separated from the fixed contact 2*b*. After the switching device 2 has been opened, the flux (broken line) created by the operating electromagnet winding 10 is added to the flux (solid line) created by the permanent magnet 7, which keeps the movable member 4 being attracted.

At this time, the number of units of the operating electromagnet winding 10 may be one in the first embodiment. The point that requires attention is that the magnetic force generated by the operating electromagnet winding 10 must be suppressed to the level at which the permanent magnet 7 will not reduce the magnetic force, because the magnetic field created by the operating electromagnet winding 10 is opposite to that of the permanent magnet 7.

Figure 8A:
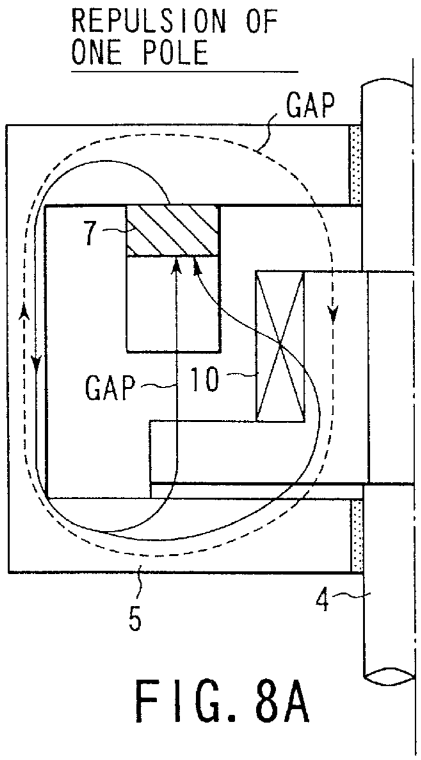
FIGS. 8A and 8B are views to help explain a closing operation in the first embodiment.
Figure 7B:
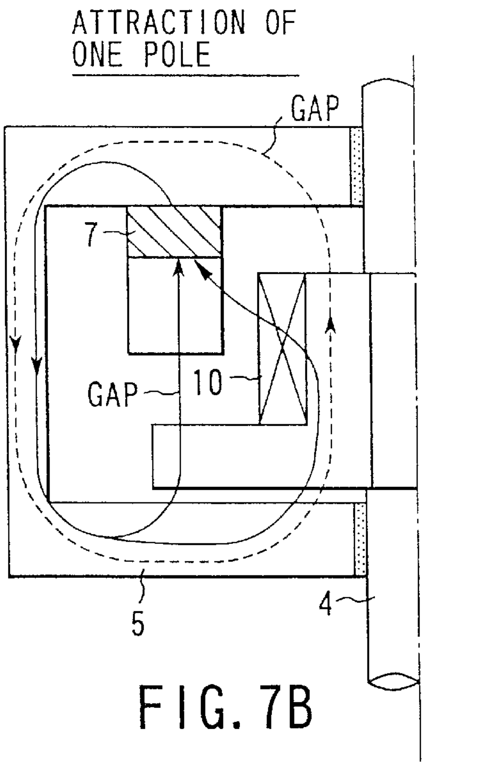
Figure 8B:
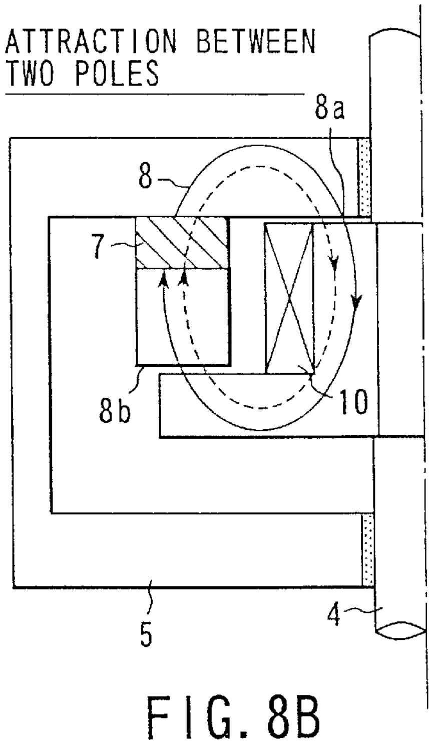

In FIG. 8A, with the switching device 2 open, when the flux created by the operating electromagnet winding 10 is caused to repel the magnetic flux (solid line) created by the permanent magnet 7, the electromagnetic force of repulsion acts the movable member 4 with respect to the fixed member 5 in the direction in the direction in which the movable contact 2*a* is pressed against the fixed contact 2*b*. In FIG. 8B, after the switching device 2 has been closed, the flux (broken line) created by the operating electromagnet winding 10 is added to the incoming and outgoing fluxes (solid line) created by the permanent magnet 7, which keeps the movable member 4 attracted, opposing the forces of the first elastic member 6 and second elastic member 11.

In FIG. 5B, the attracting force generated by the permanent magnet 7 whose flux is increased and deceased by the operating electromagnet winding 10 and acting from the fixed member 5 onto the movable member 4 is represented as $F_{m+}$ and $F_{m-}$. Since the changing characteristic of Fk (=Fk1+Fk2) is nearly equal to the changing characteristic of Fm in the movable range of the movable member 4, a variation ΔFm ($=F_{m\pm}-$Fm) in the magnetic force generated by the operating electromagnet winding is used almost as it is as an open/close driving force.

In FIGS. 6A to 6D, when the switching device 2 is closed, the peep door 12 is opened by pulling out the link pin 13*a* of the toggle link 13, pressing the peep door 12 against the N and S magnetic poles of the permanent magnet 7 to short-circuit the magnetic flux of the permanent magnet 7, which erases the magnetic force generated by the permanent magnet 7. The peep door 12 is made of a high-permeability material and also serves as the magnetic force short member. When the magnetic force has disappeared, the forces of the first elastic member 6 and second elastic member 11 act the movable member 4 with respect to the fixed member 5 in the direction in which the movable contact 2*a* is separated from the fixed contact 2*b*, which allows the force of the second member 11 to bring the switching device into the open state.

Thereafter, the tip of the toggle link 13 is aligned with the peep door 12 and the link pin 13*a* is inserted. Then, using the toggle link 13, the peep door 12 is pulled away from the N and S poles of the permanent magnet 7, thereby restoring the magnetic force of the permanent magnet 7. The flux of the permanent magnet 7 in the opening magnetic circuit 9 maintains the open state.

With the first embodiment, when the switching device 2 is closed in the FIG. 3, since the restoring force of the first elastic member 6 is a pressing force to secure the electrical characteristic between the movable contact 2*a* and fixed contact 2*b* sufficiently, an operating force greater than a specific value that bends the first elastic member 6 is needed. The incoming and outgoing fluxes 8*a*, 8*b* in the magnetic path at the N and S poles of the permanent magnet 7 in the closing magnetic circuit 8 attract the movable member 4 with a multiple force, opposing the force of the first elastic member 6. This helps make the expensive permanent magnet 7 smaller.

In FIG. 4, when the switching device 2 is open, since flexible wires or sliding parts are used for electrical connection with the movable contact 2*a*, an operating force greater than a certain value must be needed. Because the opening magnetic circuit 9 adjusts the flux of the permanent magnet 7 to cause the magnetic path 9*a* of one of the N and S poles to attract the movable member downward in the figure at a small force, thereby maintaining the open state, the force greater than the certain value can be secured, when the electromagnetic force is released by the operating electromagnet.

As shown in FIGS. 5A and 5B, since the changing characteristic of Fk (=Fk1+Fk2) is nearly equal to the changing characteristic of Fm in the movable range of the movable member 4, a variation ΔFm ($=F_{m\pm}-$Fm) in the magnetic force created by the operating electromagnet becomes almost an opening and closing driving force as it is, which makes it possible to operate the switching device using a small driving power supply with less waste.

Furthermore, as shown in FIGS. 6A to 6D, the peep door 12 is pressed against the N and S poles of the permanent magnet 7, short-circuiting the flux of the permanent magnet 7 and thereby erasing the magnetic force generated by the permanent magnet 7, which allows the forces of the first elastic member 6 and second elastic member 11 to open the switching device. Consequently, even if the operating electromagnet and its operating circuit (not shown) fail, the switching device can be opened or closed manually. After restoration, use of the toggle link 13 in the multiple force mechanism (or toggle joint mechanism) enables the peep door 12 to be separated from the N and S magnetic poles of the permanent magnet 7 manually.

Second Embodiment

Figure 9:
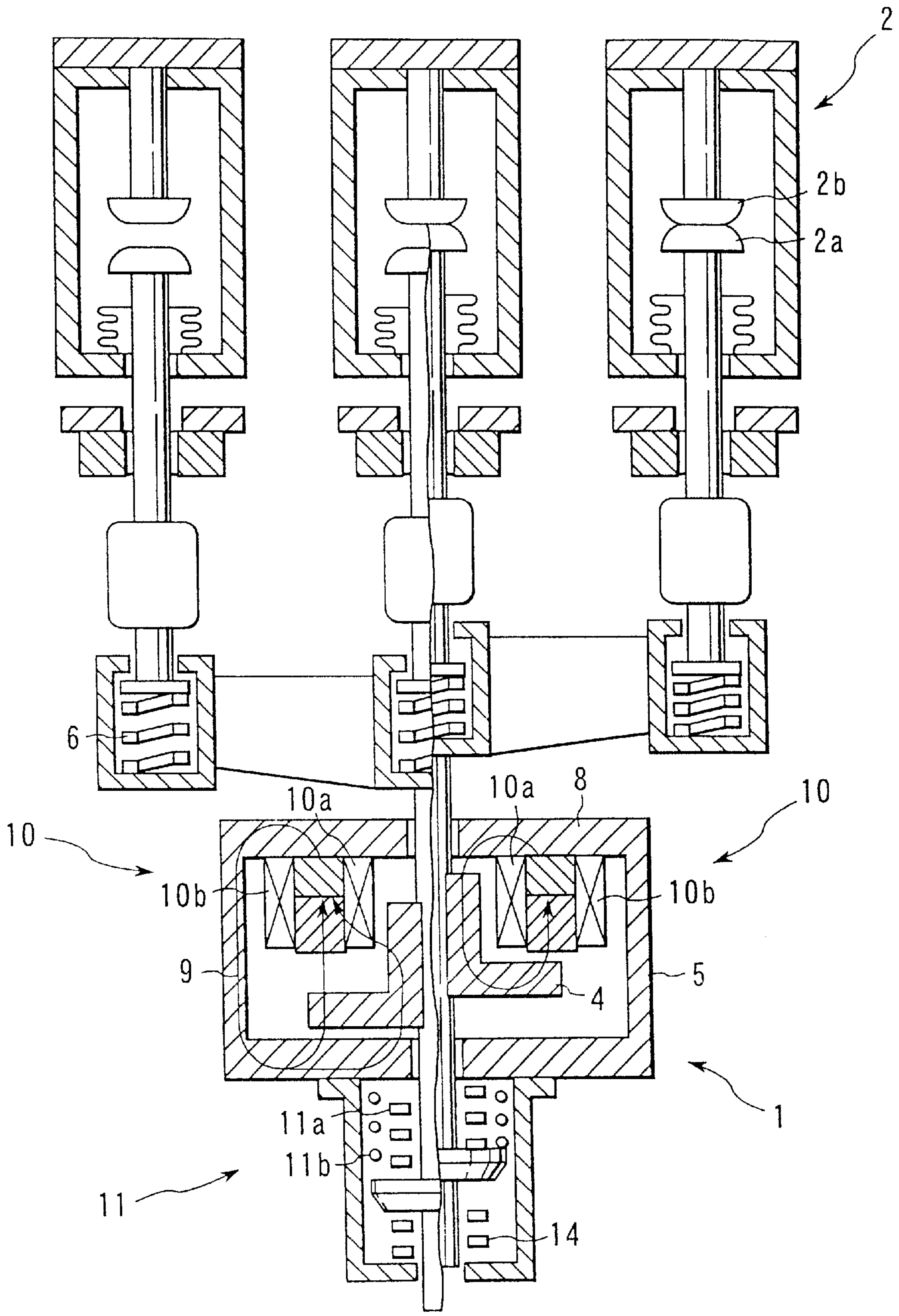
FIG. 9 is a sectional view showing the basic configuration of a second embodiment of the present invention, with the switching device open and closed.

FIG. 9 is a schematic sectional view showing the basic configuration of an operating apparatus for a switching device according to a second embodiment of the present invention. The right half of FIG. 9 shows a state where the switching device is closed and the left half shows a state where the switching device is open.

The second embodiment has the same basic configuration as that of the operating apparatus 1 for a switching device in the first embodiment. In the second embodiment, there is provided a third elastic member 14 which acts the movable member 4 with respect to the fixed member 5 in the open (break) position where the movable contact 2*a* is apart from the fixed contact 2*b*, in the direction in which the movable contact 2*a* is pressed with respect to the fixed contact 2*b*.

Furthermore, the operating electromagnet winding 10 is provided on each of the closing magnetic circuit 8 and opening magnetic circuit 9. A closing operating electromagnet winding 10*a* is provided on the fixed member 5 in the closing magnetic circuit and an opening operating electromagnet winding 10*b* is provided on the fixed member 5 in the opening magnetic circuit 9.

Figure 10A:
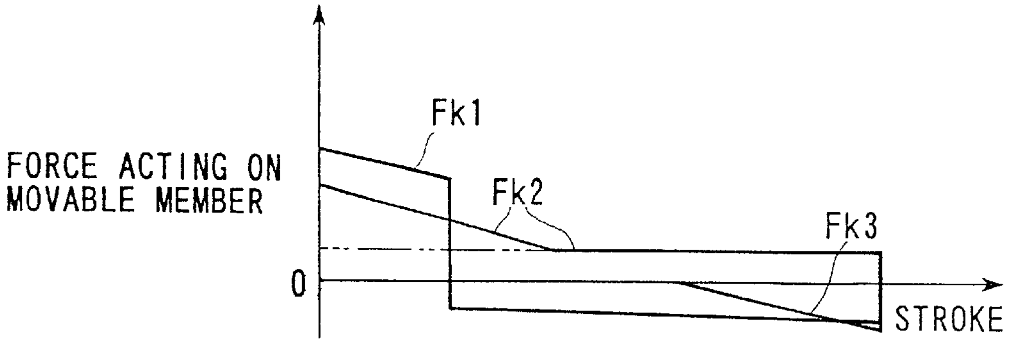
FIGS. 10A and 10B show the relationship between the stroke of the movable unit and the force applied to the unit in the basic configuration of the second embodiment.

In FIG. 10A, if the reaction force (which includes the sum of the valve vacuum self-closing force of the switching device and the elastic restoring force of the bellows of the vacuum valve) that the operating rod 3 exerts on the movable member 4 by the action of the first elastic member 6 is Fk1, the reaction force that the fixed member 5 exerts on the movable member 4 by the action of the second elastic member 11 is Fk2, the reaction force that the fixed member 5 exerts on the movable member 4 by the action of the third elastic member 14 is Fk3, and the attracting force generated by the permanent magnet 7 that the fixed member 5 acts on the movable member 4 is Fm, setting is done in such a manner that, when the changing characteristic of Fk (=Fk1+

Fk2+Fk3) is almost equal to the changing characteristic of Fm and the switching device 2 is closed, the expression Fk<Fm holds with the switching device 2 closed, and the expression Fk>Fm holds with the switching device 2 open.

Next, the operation of the operating apparatus for a switching device according to the second embodiment will be explained by reference to FIGS. 9 to 10B. In FIG. 9, the closing operating electromagnet winding 10*a* and opening operating electromagnet winding 10*b* increase and decrease the magnetic flux in the closing magnetic circuit 8 and opening magnetic circuit 9, thereby opening and closing the switching device 2.

Since the closing operating electromagnet winding 10*a* is located in the closing magnetic circuit 8 and the opening operating electromagnet winding 10*b* is located in the opening magnetic circuit 9, the magnetic fluxes created by the operating electromagnet windings 10*a*, 10*b* at the time of opening and closing always pass through the permanent magnet 7 with almost the same permeability as that of vacuum in the direction in which the flux is increased. As a result, they do not produce the opposite magnetic field to that of the permanent magnet 7.

Figure 10B:
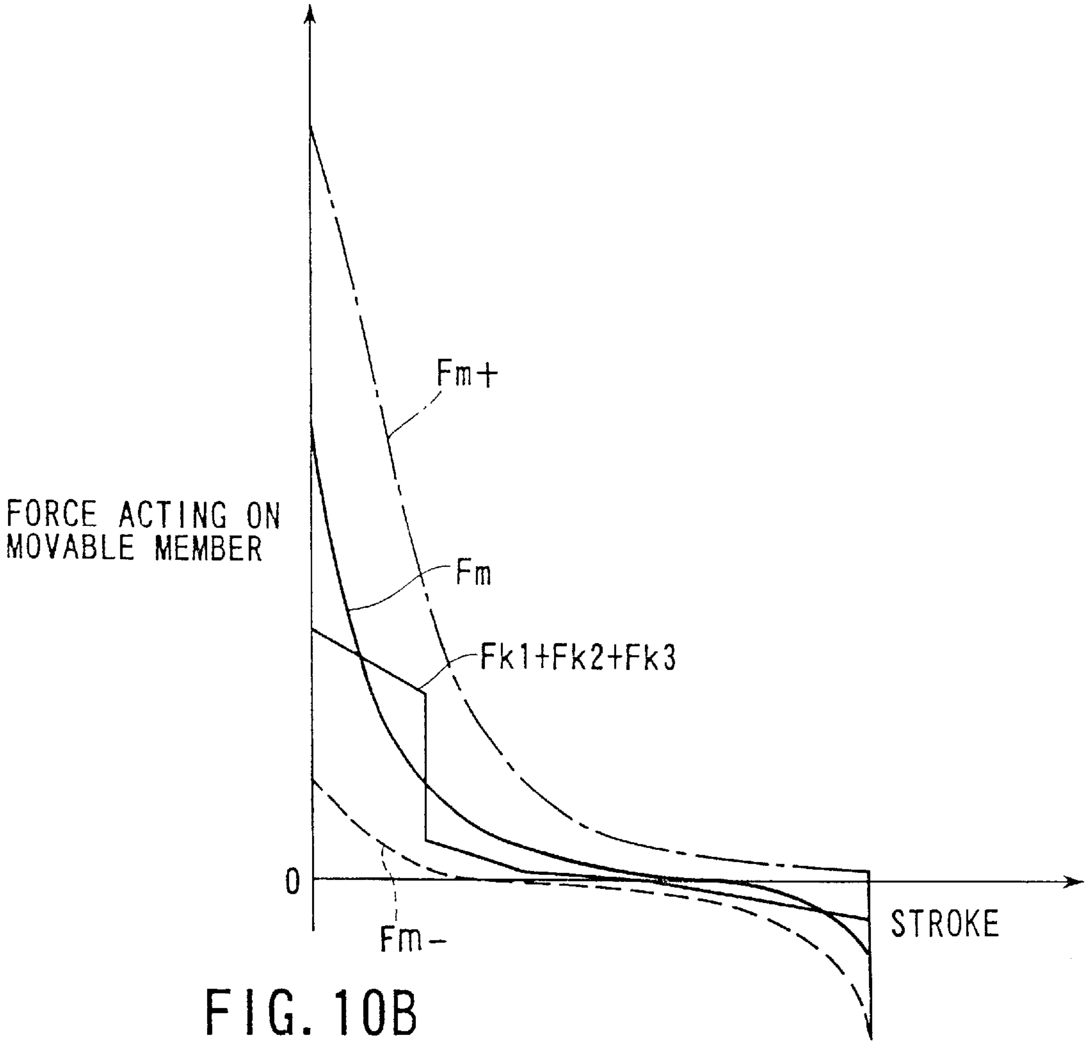

As shown in FIGS. 10A and 10B, since the changing characteristic of Fk (=Fk1+Fk2+Fk3) is nearly equal to the changing characteristic of Fm not only in the movable range of the movable member 4 but also in the state where the switching device is open, a variation ΔFm (=$F_{m\pm}$−Fm) in the magnetic force generated by the operating electromagnet winding becomes almost an opening and closing driving force as it is.

With the second embodiment, the magnetic fluxes created by the operating electromagnet windings 10*a*, 10*b* at the time of opening and closing in FIG. 9 always pass through the permanent magnet 7 with almost the same permeability as that of vacuum in the direction in which the flux in the permanent magnet 7 increases. As a result, they do not produce the opposite magnetic field to that of the permanent magnet 7, which prevents the magnet from being demagnetized even when a large flux is generated to achieve high-speed opening.

Furthermore, as shown in FIGS. 10A and 10B, a variation ΔFm (=$F_{m\pm}$31 Fm) in the magnetic force created by the operating electromagnet becomes almost an opening and closing driving force as it is, which makes it possible to operate the switching device using a small driving power supply with still less waste.

Third Embodiment

Figure 11:
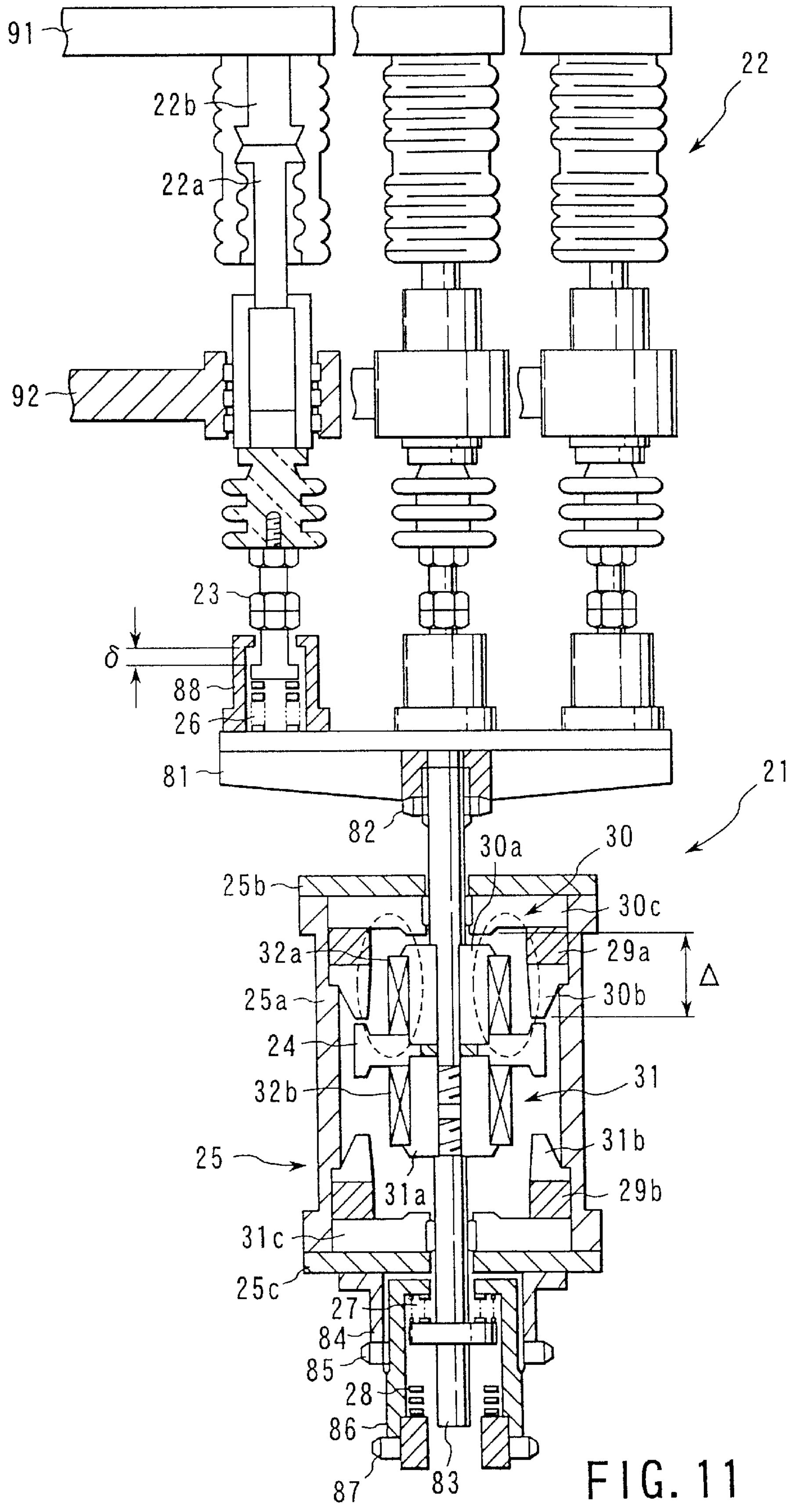
FIG. 11 is a sectional view showing the basic configuration of a third embodiment of the present invention, with the switching device closed.
Figure 13:
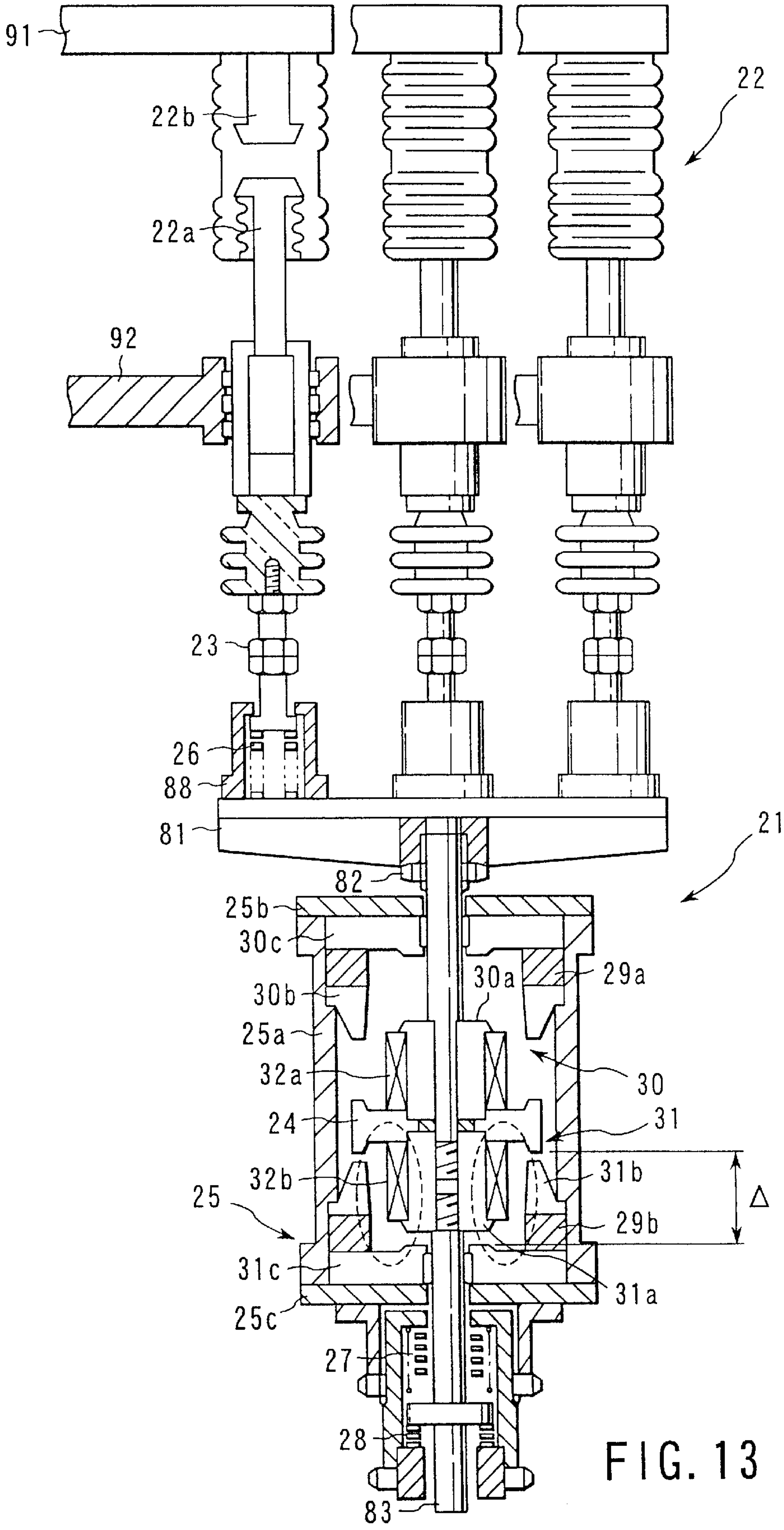
FIG. 13 is a sectional view showing the basic configuration of the third embodiment, with the switching device open.

FIGS. 11 and 13 are schematic sectional views showing the basic configuration of an operating apparatus for a switching device according to a third embodiment of the present invention. While FIGS. 11 and 13 show operating apparatuses when, for example, a three-phase vacuum switching device with vacuum valves is used as a switching device, the present invention is not limited to the vacuum switching device or the three-phase structure. Another type of switching device with another structure may be used.

Each vacuum valve 22 has a movable contact 22*a* and a fixed contact 22*b*, which are provided in a vacuum container in such a manner that they can come into contact with each other and separate from each other. Each movable contact 22*a* is coupled with an operating rod 23. The other end of each operating rod 23 is allowed to penetrate to the bottom surface of a cylindrical cover 88 fixed on a common coupling trestle 81 and is coupled with the trestle in such a manner that the rod 23 can move up and down. In each cylindrical cover 88, a first elastic member 26, explained later, is provided between the plate surface of the coupling trestle 81 and the lowest end of each operating rod 23.

Current path terminals 91, 92 are electrically connected to the movable contact 22*a* and fixed contact 22*b* of each vacuum valve 22, respectively.

Figure 15:
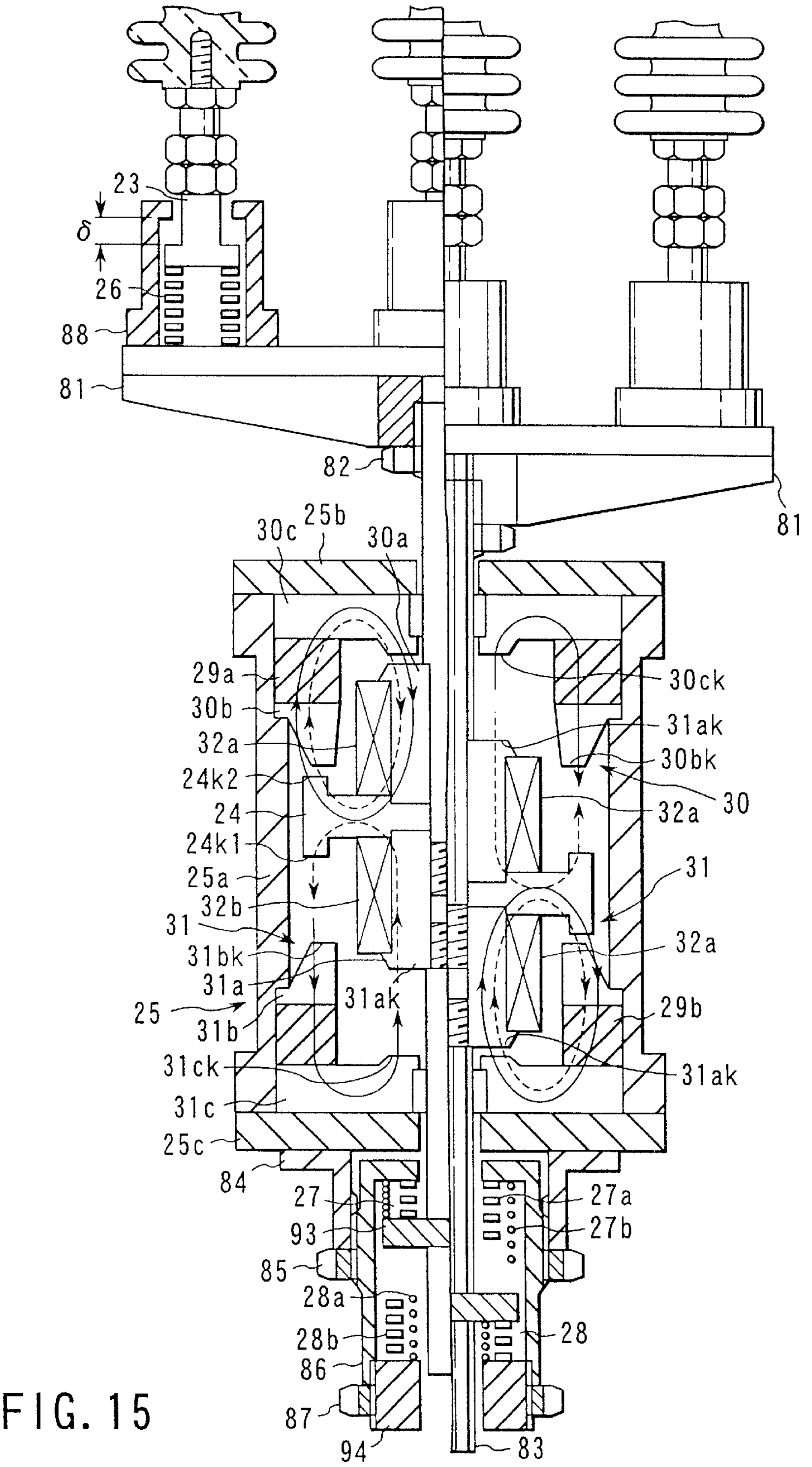
FIG. 15 is a view to help explain an opening operation in the third embodiment of FIGS. 11 and 13.
Figure 16:
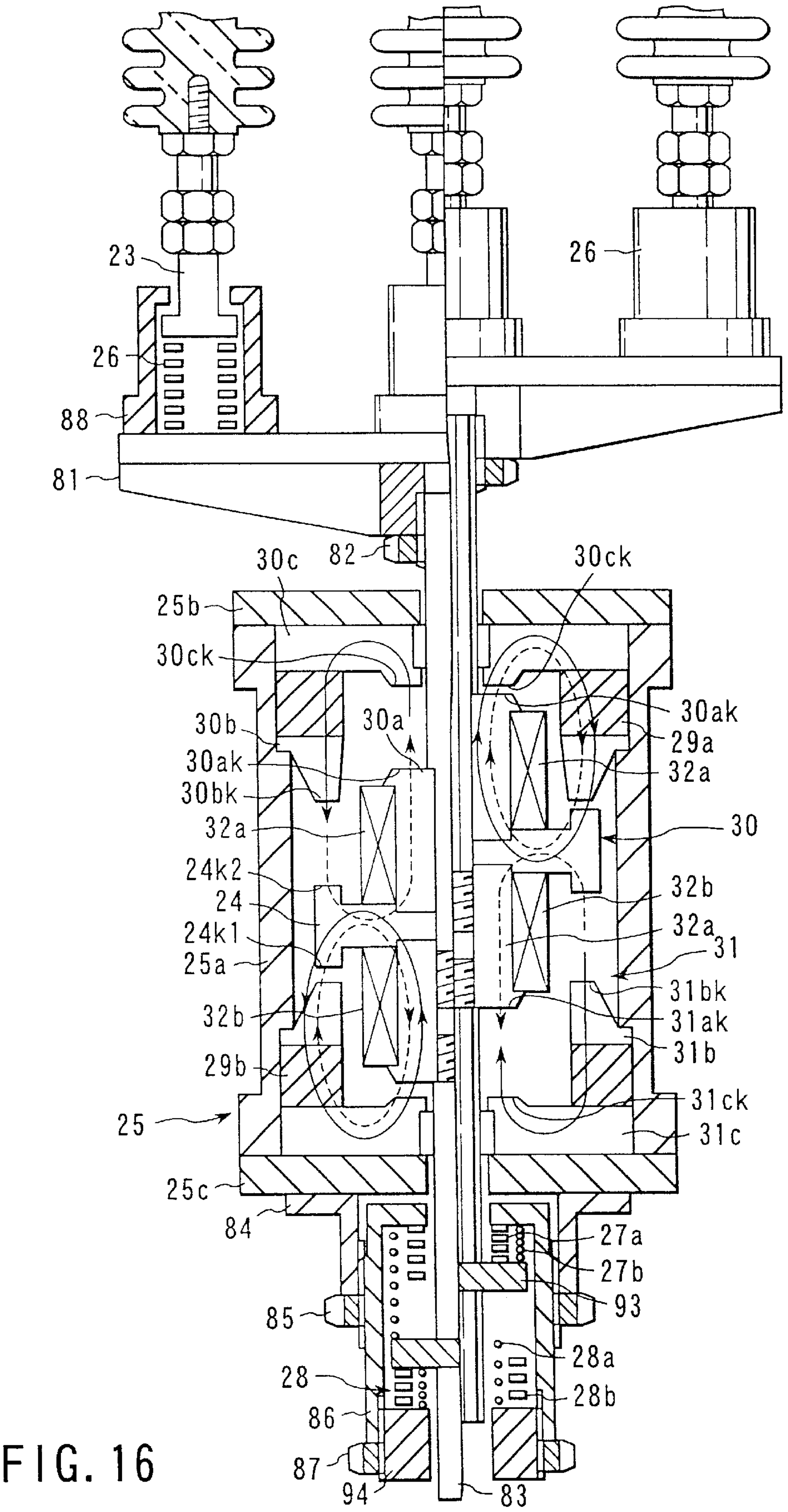
FIG. 16 is a view to help explain a closing operation in the third embodiment of FIGS. 11 and 13.

An operating apparatus shaft 83 is set vertically almost in the center of the bottom surface of the coupling trestle 81. Specifically, the operating apparatus shaft 83 is screwed vertically to the bottom surface of the coupling trestle 81 and secured with a lock nut 82 as shown in FIGS. 15 and 16.

A disk made of magnetic material of which the movable member 24 is made is provided in the middle of the operating apparatus shaft 83 in such a manner that the shaft 83 penetrates through the disk and the disk is secured to the shaft 83 so that they cross each other at right angels. The disk has attracting surfaces (sucking surfaces) 24*k*1, 24*k*2 extending upward and downward.

The movable member 24 is connected to the operating rod 23 in such a manner that the member 24 can move relatively with respect to the rod 23. The relative movement of the movable member 24 with respect to the operating rod 23 is restricted to a specific moveable range of δ.

A cylindrical iron core 30*a* is provided on the outer surface of the operating apparatus shaft 83 and on the top of the movable member 24. On the outer surface of the cylindrical iron core 30*a*, an operating closing electromagnet winding 32 are provided.

Furthermore, there is provided a fixed member 25 which encloses the cylindrical iron core 30*a* and operating closing electromagnet winding 32*a* on the operating apparatus shaft 83 and the cylindrical iron core 31*a* and operating closing electromagnet winding 32*b* on the operating apparatus shaft 83 and enables the operating apparatus shaft 83 to slide in the direction of shaft. Specifically, the fixed member 25 is composed of a circular cylinder 25*a* and lids 25*b*, 25*c* that close both the ends of the cylinder 25*a* and support the operating apparatus shaft 83 in such a manner that the shaft 83 can slide.

In the fixed member 25, a magnetic disk 30*c* with an attracting surface 30*ck* is fixed to the middle of the lid 25*b*. A circular-ring-shaped permanent magnet 29*a* is fixed to the inner surface of the cylinder 25*a* at the part where the magnetic disk 30*c* crosses the cylinder 25*a*. In this case, both ends of the permanent magnet 29*a* in the direction of shaft are magnetized so that one end becomes the N pole and the other becomes the S pole. A circular magnetic ring 30*b* with an attracting surface 30*bk* at one end in the direction of shaft is secured to the inner surface of the cylinder 25*a*, while being pressed against one end of the permanent magnet 29*a* in the direction of shaft.

As described above, the closing magnetic circuit 30 is composed of the magnetic disk 30*c*, permanent magnet 29*a*, magnetic ring 30*b*, and cylindrical iron core 30*a*.

In addition, a cylindrical iron core 31*a* is provided on the outer surface of the operating apparatus shaft 83 and in the lower part of the movable member 24. On the outer surface of the cylindrical iron core 31*a*, an opening operating electromagnet winding 32*b* is provided.

In the fixed member 25, a magnetic disk 31*c* with an attracting surface 31*ck* is fixed to the middle of the lid 25*c*. A circular-ring-shaped permanent magnet 29*b* is fixed to the inner surface of the cylinder 25*a* at the part where the magnetic disk 31*c* crosses the cylinder 25*a*.

In this case, both ends of the permanent magnet 29*b* in the direction of shaft are magnetized so that one end becomes the N pole and the other becomes the S pole and they are smaller in magnetic force than the permanent magnet 29*a* by the intensity of the first elastic member 26. Specifically, since the intensity of a permanent magnet is proportional to the magnetized area, the permanent magnet 29*a* with a small magnetized area is used. A circular magnetic ring 31*b* with an attracting surface 31*bk* at one end in the direction of shaft is secured to the inner surface of the cylinder 25*a*, while being pressed against one end of the permanent magnet 29*b* in the direction of shaft.

As described above, the opening magnetic circuit 31 is composed of the magnetic disk 31*c*, permanent magnet 29*b*, magnetic ring 31*b*, movable member 24, and cylindrical iron core 31*a*.

Between the bottom surface of the lid 25*c* and the projecting end of the operating apparatus shaft 83, a second elastic member 27 and a third elastic member 28, which will be explained below, are provided.

A first cylindrical member 84 with a brim at one end is bolted to the bottom surface of the lid 25*c* with a nut. A second cylindrical member 86 with a bottom at one end is inserted into the inside of the cylindrical member 84 and a lock nut 85 is screwed on a male screw section formed on the outer surface of the cylindrical member 86, thereby securing the cylindrical member 84 to the cylindrical member 86.

A movable disk 9 is secured to the operating apparatus shaft on the projection side inside the cylindrical member 86 in such a manner that the shaft 83 penetrates through the disk 9 and the disk 9 crosses the center of the shaft at right angles. A second elastic member 27 composed of a multistage spring, such as two stages of nonlinear springs 27*a*, 27*b*, is provided on the outer surface side of the operating apparatus shaft 83 between the top surface of the movable disk 94 and the bottom surface of the cylindrical member 86.

A stop ring 94 is inserted into the inside of the cylindrical member 86 at the lower end, and a lock nut 87 is screwed on a male screw section formed on the outer surface of the stop ring 94, which fastens the stop ring 94 to the cylindrical member 86. A third elastic member 28 composed of a multistage spring, such as two stages of nonlinear springs 28*a*, 28*b*, is provided on the outer surface side of the operating apparatus shaft 83 between the stop ring 94 and the bottom surface of the movable disk 93.

The fixed member 25 holds the movable member 24 in such a manner that the movable member 24 can move up and down in the figure. The first elastic member 26 is designed to act the operating rod 23 with respect to the movable member 24 in the direction (upward in the figure) in which the movable contact 22*a* is pressed against the fixed contact 22*b*.

The second elastic member 27 is designed to act the movable member 24 with respect to the fixed member 25 in the direction (downward in the figure) in which the movable contact 22*a* is separated from the fixed contact 22*b*. The third elastic member 28 is designed to act the movable member 24 with respect to the fixed member 25 in the direction in which the movable contact 22*a* is pressed against the fixed contact 22*b*.

Since the third elastic member 28 is compressed in the middle of the stroke of the movable member 24, the third elastic member 28 with a free length has not reached the movable member 24 in FIG. 11. The permanent magnets 29*a*, 29*b* act the movable member with respect to the fixed member 25 by a force of attraction.

The closing magnetic circuit 30 is constructed as follows. When the movable contact 22*a* is pressed against the fixed contact 22*b* and the switching device is closed, the attracting surfaces 30*ak*, 30*bk* through which the magnetic path of the N and S poles of the permanent magnet 29*a* passes attracts the fixed member 25 in the direction in which the movable contact 22*a* is pressed against the fixed contact 22*b*. In a state where the areas of the attracting surfaces of the N and S poles of the closing magnetic circuit 30 become almost equal and the attracting surfaces come closer, the density of magnetic flux created by the permanent magnet 29*a* at the attracting surfaces 30*ak*, 30*bk* of the closing magnetic circuit come closer to the magnetic saturation starting point of the material.

Figure 12:
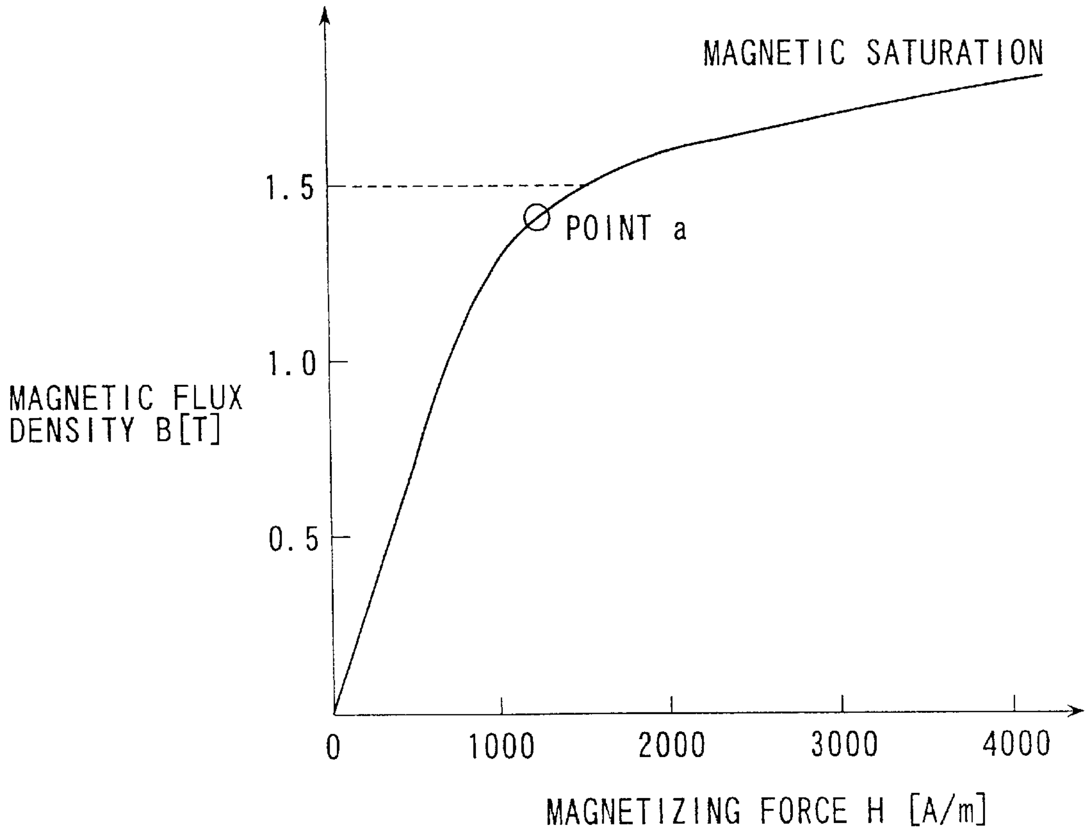
FIG. 12 shows the relationship between the magnetomotive force and magnetic flux density at the attracting surface of the closing magnetic circuit or opening magnetic circuit.

FIG. 12 shows the relationship between the magnetomotive force H [A/m] and magnetic flux density B[T] when the material of which the magnetic circuit is made is iron. The magnetic flux saturation starting point is indicated by point a.

In FIG. 13, the opening magnetic circuit 31 is constructed as follows. When the movable contact 22*a* is apart from the fixed contact 22*b* and the switching device is open, the attracting surfaces 31*ak*, 31*bk* through which the magnetic path of the S and N poles of the permanent magnet 29*b* passes attract the fixed member 25 in the direction in which the movable contact 22*a* is separated from the fixed contact 22*b*, thereby making the areas of the attracting surfaces of the N and S poles of the opening magnetic circuit 31 almost equal.

The operating electromagnet windings 32*a*, 32*b* provided on the movable member 24 are for increasing and decreasing the magnetic force of the closing magnetic circuit 30 and opening magnetic circuit 31.

In the closing magnetic circuit 30 and opening magnetic circuit 3, the positions of the attracting surfaces 30*ak*, 30*bk*, 31*ak*, and 31*bk* of the N and S poles are shifted a distance of Δ in the direction in which the movable member 24 moves. The distance Δ is set longer than the stroke of the movable member 24.

Figure 14:
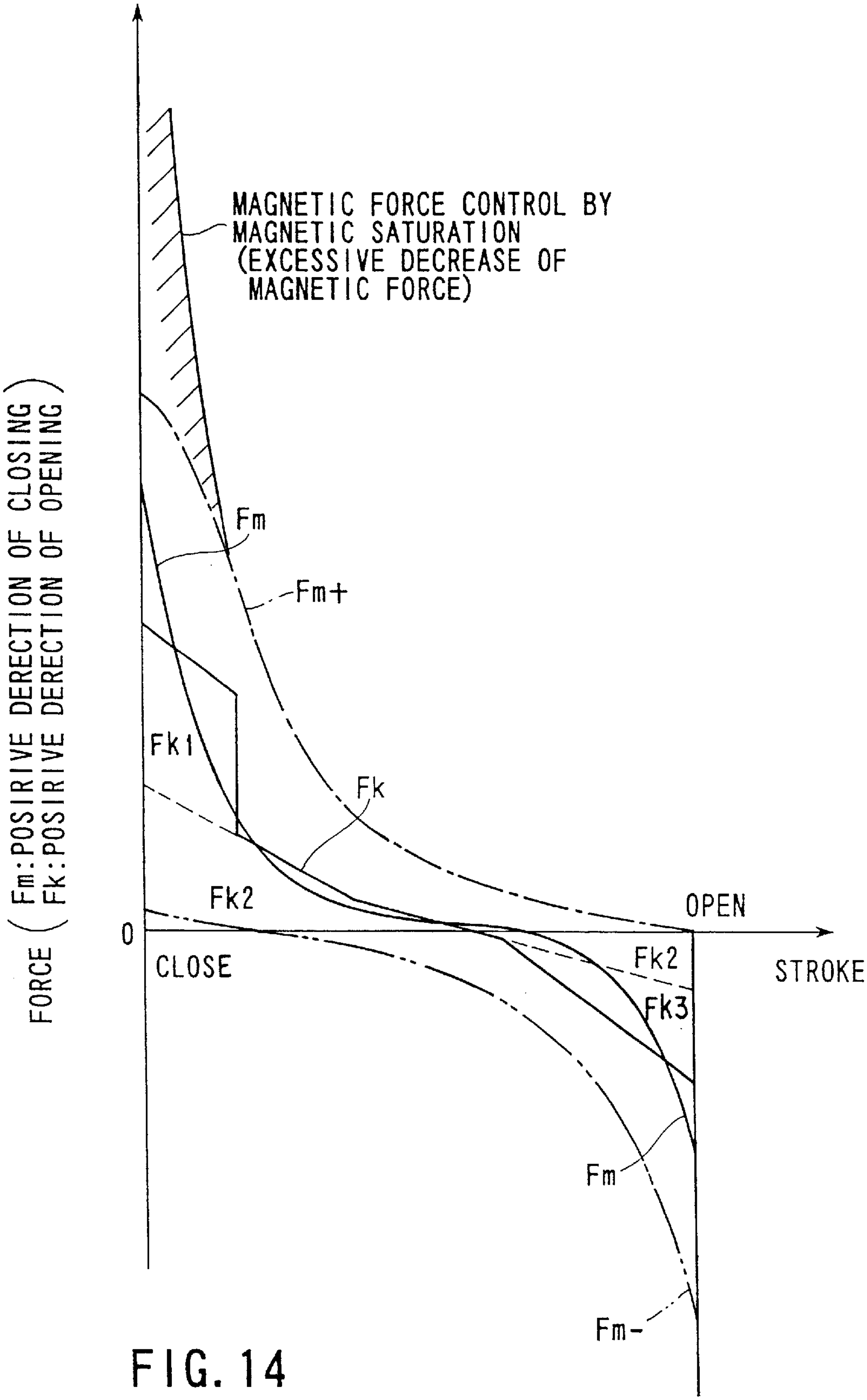
FIG. 14 shows the relationship between the stroke of the movable unit and the force applied to the unit in the third embodiment of FIGS. 11 and 13.

Furthermore, as shown in FIG. 14, if the reaction force that the operating rod 23 exerts on the movable member 24 by the action of the first elastic member 26 is Fk1, the reaction force that the fixed member 25 exerts on the movable member 24 by the action of the second elastic member 27 is Fk2, the reaction force that the fixed member 25 exerts on the movable member 24 by the action of the third elastic member 28 is Fk3, and the attracting force generated by the permanent magnets 29*a*, 29*b* that the fixed member 25 acts on the movable member 24 is Fm, setting is done in such a manner that, when the changing characteristic of Fk (=Fk1+Fk2+Fk3) is almost equal to the changing characteristic of Fm, the expression Fk<Fm holds with the switching device closed, and the expression Fk>Fm holds with the switching device open and that, when the switching device is closed or open, the difference between Fk and Fm is larger than the value obtained by multiplying the total weight of the movable parts including the movable member and movable contact 22*a* by the acceleration of an estimated vibration.

Next, the operation of the third embodiment will be explained by reference to FIGS. 11 to 16.

In FIG. 11, when the switching device is closed, the attracting surfaces 30*ak*, 30*bk* of the N and S poles of the permanent magnet 29*a* in the closing magnetic circuit 30 attract the movable member 24 with the multiple force, thereby maintaining the closed state, opposing the forces of the first elastic member 26 and second elastic member 27.

Since the areas of the attracting surfaces 30*ak*, 30*bk* are almost equal, the magnetic fluxes at the attracting surfaces

30*ak*, 30*bk* of the N and S poles are almost equal. When a strong electromagnetic attracting force is required, the forces created by the attracting surfaces 30*ak*, 30*bk* increase to a maximum. Because the magnetic flux density at the attracting surfaces 30*ak*, 30*bk* of the N and S poles of only the permanent magnet 29 is in the vicinity of the magnetic saturation starting point, the flux density is near point a in FIG. 12. A negative magnetomotive force decreases the magnetic flux density significantly, whereas a positive magnetomotive force is suppressed so that the magnetic flux may not increase.

In FIG. 11, when the attracting surfaces 30*ak*, 30*bk* come closer, the operating force created by the operating electromagnet windings 32*a*, 32*b* decrease significantly. If there were no magnetic saturation, the operating force would increase excessively. The presence of magnetic saturation suppresses the increase to a small amount.

In FIG. 13, when the switching device is open, the attracting surfaces 31*ak*, 31*bk* of the N and S poles of the permanent magnet 29*b* in the opening magnetic circuit 31 attract the movable member 24, thereby maintaining the open state. Since the areas of the attracting surfaces 31*ak*, 31*bk* are almost equal, the magnetic fluxes at the attracting surfaces of the N and S poles are almost equal. When a strong electromagnetic attracting force is required, the forces generated by the attracting surfaces increase to a maximum.

In FIG. 14, the attracting forces created by the permanent magnets 29*a*, 29*b* acting from the fixed member 25 onto the movable member 24 is expressed by Fm.

In FIGS. 11 and 13, the operating electromagnet winding 32 increases and decreases the magnetic force in the closing magnetic circuit 30 and opening magnetic circuit 31, thereby opening and closing the switching device. Hereinafter, explanation will be given by reference to enlarged views of the magnetic circuits 30, 31. An opening operation will be described by reference to FIG. 15.

With the switching device closed at left in FIG. 15, when the flux (broken line) of the operating electromagnet winding 32 is caused to repel the flux (solid line) of the permanent magnet 29*a*, the forces of the first elastic member 26 and second elastic member 27 added to the electromagnetic repelling force act the movable member 24 with respect to the fixed member 25 in the direction in which the movable contact 22*a* is separated from the fixed contact 22*b*. After a state where the switching device is open has been reached at right in FIG. 15, the flux (broken line) of the operating electromagnet winding 32 is added to the flux (solid line) of the permanent magnet 29*b*, producing a state where the movable member is attracted, opposing the force of the third elastic member 28.

In the embodiment, the number of units of the operating electromagnet winding 32 may be one. It should be noted that, since the magnetic field created by the operating electromagnet winding 32 is opposite to those created by the permanent magnets 29*a*, 29*b*, the magnetic force created by the operating electromagnet winding 32 must be suppressed to such a level as prevents the permanent magnets 29*a*, 29*b* from being demagnetized.

Using FIG. 16, a closing operation will be explained. With the switching device open at left in FIG. 16, when the flux of the operating electromagnet winding 32 is caused to repel the flux (solid line) of the permanent magnet 29*b*, the force of the third elastic member 28 added to the electromagnetic repelling force acts the movable member 24 with respect to the fixed member 25 in the direction in which the movable contact 22*a* is pressed against the fixed contact 22*b*. After a state where the switching device is closed has been reached at right in FIG. 16, the flux (broken line) of the operating electromagnet winding 32 is added to the flux (solid line) of the permanent magnet 29*a*, producing a state where the movable member is attracted, opposing the forces of the first elastic member 27 and second elastic member 27.

In FIG. 14, the attracting force from the fixed member to the movable member 24 created by the permanent magnet 29 and increased and decreased by the operating electromagnet winding 32 is represented by $F_{m+}$ (singe-dot-dash line) and $F_{m-}$ (two-dot-dash line). Since the changing characteristic of Fk (=Fk1+Fk2+Fk3) is nearly equal to the changing characteristic of Fm in the movable range of the movable member 24, a variation ΔFm ($=F_{m\pm}-Fm$) in the magnetic force created by the operating electromagnet becomes almost an opening and closing driving force as it is.

Furthermore, in FIG. 12, the positions of the attracting surfaces 30*ak*, 30*bk*, 31*ak*, and 31*bk* of the N and S poles in the closing magnetic circuit 30 and opening magnetic circuit 31 are shifted a distance of Δ in the direction in which the movable member 24 moves. As a result, the flux acts almost uniformly in the direction in which the movable member 24 moves, between the attracting surfaces of the N and S poles shifted in position.

The attracting surfaces of the N and S poles shifted in position exert stronger electromagnetic attracting force than when the attracting surfaces of the N and S poles lie side by side in the same position (Δ=0). Since the distance Δ between the N and S poles is longer than the stroke of the movable member 24, the facing attracting surfaces (30*ak* and 30*bk*) (31*ak* and 31*bk*) are kept engaged with each other, even when the movable member 24 is away from the fixed member.

This assures enough magnetic flux to produce a sufficient operating force with a longer stroke. Since the N and S poles produce a double attracting force, an enough acceleration to overcome the mechanical frictional force can be realized. In addition, because the positions of the attracting surfaces (30*ak* and 30*bk*) (31*ak* and 31*bk*) of the N and S poles are shifted a distance of Δ, the flux acts almost uniformly in the direction in which the movable member moves, thereby maintaining a strong operating force at a distance. This realizes a fast initial speed and an operating force not decreasing in the middle of a long stroke.

In FIG. 14, when the switching device is closed, the expression Fk<Fm in force holds, maintaining the closed state. When the switching device is open, the expression Fk>Fm holds, maintaining the open state. Furthermore, when a vibration has occurred, the inertial force obtained by multiplying the weight of the movable part by the gravitational acceleration caused by the vibration is applied to the movable part. The closed state or open state is maintained, because the difference between Fk and Fm is set greater than the value of the inertial force.

With the third embodiment, when the switching device is closed in FIG. 12, the restoring force of the first elastic member 26 is a pressing force to assure a sufficient electrical characteristic between the movable contact 22*a* and fixed contact 22*b*. Therefore, an operating force greater than a specific value that bends the first elastic member 26 is needed.

Since the attracting surfaces 30*ak*, 30*bk* of the N and S poles of the permanent magnet 29*a* in the closing magnetic circuit 30 attract the movable member at a multiple force to maintain the closed state, opposing the force of the first elastic member 26, the expensive permanent magnet 29 can be made smaller. When a strong electromagnetic attracting force is needed, the forces of the two attracting surfaces 30*ak*, 30*bk* are increased to a maximum. Since the magnetic flux at the attracting surfaces 30*ak*, 30*bk* of the N and S poles of only the permanent magnet 29*a* is near the magnetic saturation starting point, the operating forces created by the operating electromagnets 32*a*, 32*b* decrease the flux significantly, having no effect on the opening speed. The force created by the operating electro-magnet is suppressed by magnetic saturation to the necessary minimum, which alleviates impact at the time of closing.

In FIG. 13, when the switching device is open, an operating force greater than a specific value to overcome friction is needed, because flexible wires or sliding parts are used for electrical connection with the movable contact 22*a*. Since the opening magnetic circuit 31 adjusts the flux of the permanent magnet 29*b* and the attracting surfaces 31*ak*, 31*bk* of the N and S poles attract the movable member downward in the figure, thereby maintaining the open state, a force greater than a certain value can be secured when the magnetic force is released by the operating electromagnet winding 32.

Furthermore, with the facing attracting surfaces (30*a* and 30*bk*) (31*ak* and 31*bk*) engaged with each other at the distance Δ, since a relatively strong magnetic attracting force acts even when the movable member 24 is at a distance, an operating force to move the heavy movable member 24 a long way can be maintained.

Since the double attracting force created by the N and S poles and the shifted positions of the attracting surfaces (30*ak* and 30*bk*) (31*ak* and 31*bk*) of the N and S poles realize a fast initial speed and an operating force not decreasing in the middle of a long stroke, the operating apparatus of the present invention can be applied to a switching device with a long stroke.

In FIG. 14, since the changing characteristic of Fk (=Fk1+Fk2+Fk3) is nearly equal to the changing characteristic of Fm in the movable range of the movable member 4, a variation ΔFm (=$F_{m\pm}$−Fm) in the magnetic force created by the operating electromagnet winding 32 becomes almost an opening and closing driving force as it is. As a result, the switching device can be operated using a necessary minimum driving power supply.

If current is allowed to flow through the operating electromagnet winding 32 to a degree that the permanent magnet 29 is not demagnetized, an initial speed to move the heavy movable member 24 a long way can be secured. Since the state is maintained by the balance of force in both closing and opening, current normally need not be supplied to the operating electromagnet. In addition, since the closed state and open state are maintained even when there was an impact, there is no faulty operation due to vibrations, assuring the reliable supply of electric power.

Fourth Embodiment

Figure 17D:
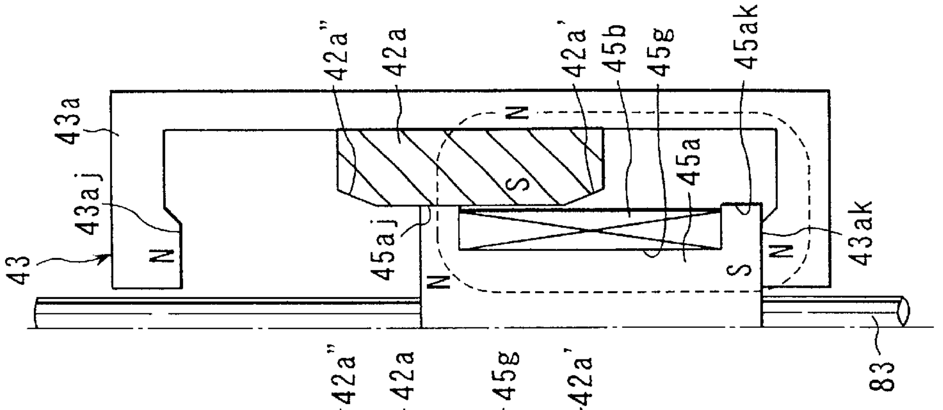
FIGS. 17A to 17D show the basic configuration of a magnetic circuit according to a fourth embodiment of the present invention.
Figure 17C:
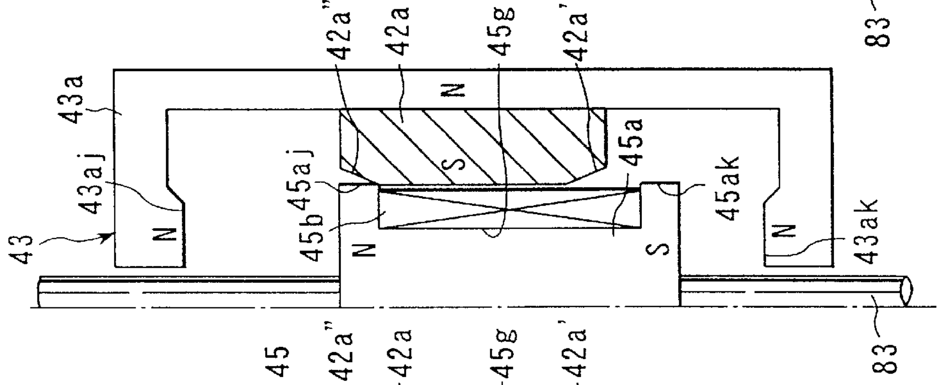
Figure 17B:
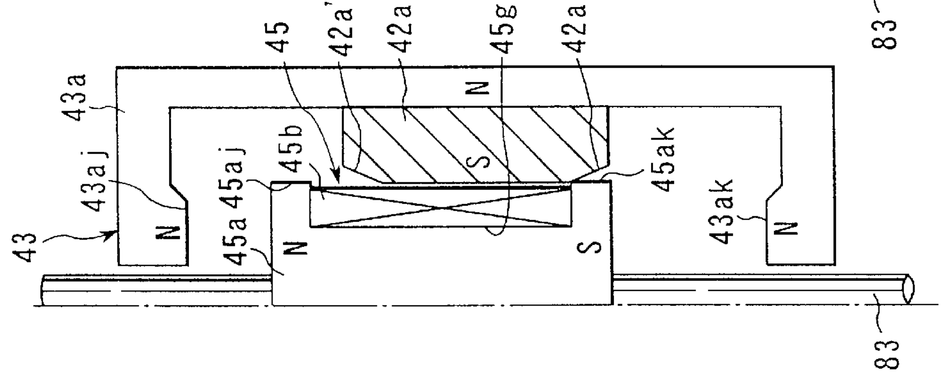
Figure 17A:
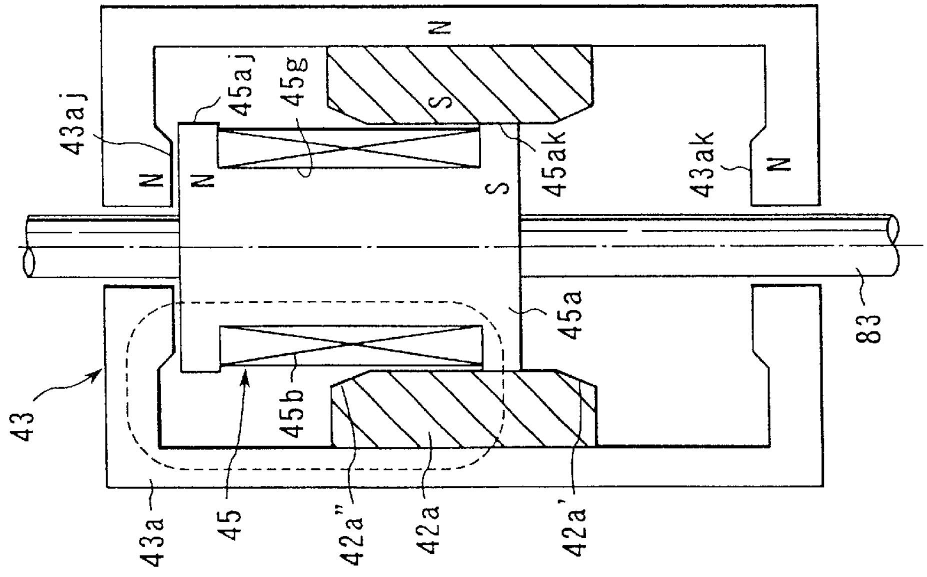

FIGS. 17A to 17D schematically show the configuration of a magnetic circuit in an operating apparatus for a switching device according to a fourth embodiment of the present invention. FIG. 17A shows a state where the switching device is closed and FIG. 17D shows a state where the switching device is open. The fourth embodiment has the same configuration as that of the third embodiment except that a magnetic circuit 43 acts as both the closing magnetic circuit 30 and the opening magnetic circuit 31.

The magnetic circuit 43 includes a fixed member composed of a magnetic material (yoke) 43*a* and a permanent magnet 42*a* and an iron core (and an operating electromagnet including an operating electromagnet winding 45*b*, or a movable core 45).

The magnetic material (yoke) 43*a* is of a cylinder shape and has end plates at both ends of the cylinder. The end plates have attracting surfaces 43*aj*, 43*ak* lifting inward in places where the operating apparatus shaft 83 is inserted.

The permanent magnet 42*a* is provided in the middle of the inner surface of the magnetic material 43*a* in the direction of shaft and has a cylindrical shape. The outer surface and inner surface of the permanent magnet 42*a* are magnetized so that they become the N pole and S pole, respectively. The permanent magnet has beveled edge sections 42*a*' and 42" at the corners of the both ends on the inner surface side in the direction of shaft.

The iron core 45*a* has a cylindrical shape and is provided inside the magnetic material 43*a* and on the outer surface of the operating apparatus shaft 83. In the middle of the iron core in direction of shaft, a winding housing section 45*g* is formed. The iron core has attracting surfaces 45*aj*, 45*ak* on both side of the winding housing section 45*g* and on the outer surface of both ends in the direction of shaft. An operating electromagnetic winding 45*b* is provided in the winding housing section 45*g* of the iron core 45*a*, which constitutes an operating electromagnet or the movable member 45.

Because of the relationship between the fixed member and movable member 45, the S pole of the permanent magnet 42*a* is designed to attract the N pole of the iron core 45*a*, or the N pole created by exciting the operating electromagnet winding 45*b* constituting the operating electromagnet, in the middle of the movable range (the distance between the attracting surfaces 43*aj* and 43*ak* of the magnetic material 43*a*) of the movable member 45.

In the closed state in FIG. 17A, the magnetic circuit 43 is so constructed that the attracting surface 43*aj* attracts the movable member and the attracting surface 45*aj* allows the flux to pass through without leakage.

In a position shifted from the closed state in FIG. 17B, the magnetic circuit 43 is so constructed that the attracting surface 43*aj* is separated from the movable member and the edge section 42*a*' of the S pole of the permanent magnet 42*a* attracts the attracting surface 45*ak*.

In a position closer to the open state in FIG. 17C, the magnetic circuit 43 is so constructed that the attracting surface 43*aj* is still away from the movable member and the edge section 42*a*" of the S pole of the permanent magnet 42*a* attracts the attracting surface 45*aj*.

In the open state in FIG. 17D, the magnetic circuit 43 is so constructed that the attracting surface 43*ak* in the lower part of the magnetic material 43*a* attracts the movable member and the attracting surface 45*ak* allows the flux to pass through without leakage.

In the magnetic circuit 43, the attracting surfaces 43*aj* and 45*ak* are placed in staggered fashion and similarly the attracting surfaces 43*ak* and 45*aj* are placed in staggered fashion. Between these attracting surfaces, the operating electromagnet composed of the iron core 45*a* and operating electromagnet winding 45*b*, or the movable member 45, is arranged.

Next, the operation of the fourth embodiment will be explained by reference to FIGS. 17A to 18. Reference symbols A to D in FIG. 18 indicate the points in time of the states shown in FIGS. 17A to 17D.

The edge sections 42*a*', 42*a*" of the S pole of the permanent magnet 42*a* in FIGS. 17A to 17D exert a sufficient force on the movable member 45 even in the middle of the movable range of the movable member 45, enabling the switching device with a long stroke to be opened and closed without stopping because of a load applied in the middle of operation.

Figure 18:
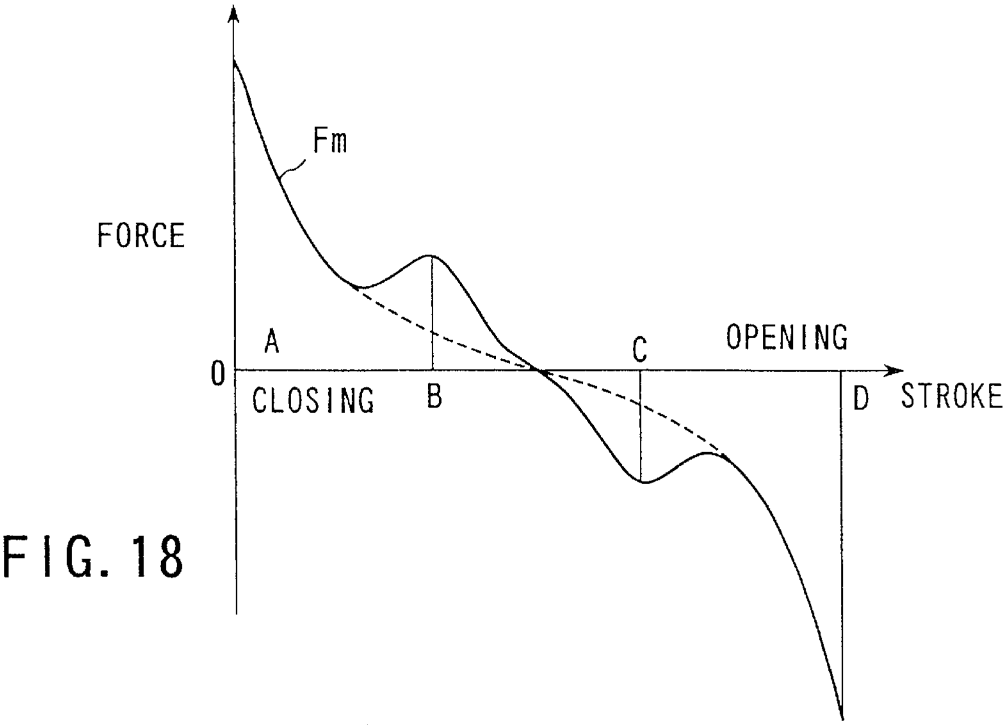
FIG. 18 shows the relationship between the stroke of the movable unit and the force applied to the unit in the fourth embodiment of FIGS. 17A to 17D.

As shown in FIG. 18, the magnetic force Fm created by the edge sections 42*a*', 42*a*" of the permanent magnet 42*a* has an upheaval in the middle of the stroke and presents a higher value all over the stroke than when there is no edge section (broken line). The magnetic force created by the operating electromagnet (movable member 45) composed of the operating electromagnet winding 45*b* and iron core 45*a* is caused to repel and attract the magnetic force Fm, thereby producing an operating force all over the stroke.

When current is caused to flow through the operating electromagnet winding 45*b* in the closed state of FIG. 17A, the N pole created at the top end of the iron core in the direction of shaft repels the N pole created at the attracting surface 43*ak* in the magnetic circuit 43 by the N pole of the permanent magnet 42*a*, thereby moving the movable member 45 downward in the figure.

As a result, the force of repulsion acting between the attracting surface 43*ak* and the end of the iron core 45*a* in the direction of shaft decreases gradually. In a position to which the movable member 45 has moved slightly from the closed state as shown in FIG. 17B, the S pole inside the permanent magnet 42*a* repels the S pole created at the attracting surface 45*ak* by the operating electromagnet winding 45*b*, thereby pressing the movable member downward in the figure.

Then, in a position closer to the open state in FIG. 17C, at the attracting surface 45*aj*, the S pole created by the permanent magnet 42*a* attracts the N pole created by the operating electromagnet composed of the operating electromagnet winding 45*b* and iron core 45*a*, thereby pulling the movable member 45 downward in the figure.

In the open state of FIG. 17D, at the attracting surface 43*ak*, the N pole created by the permanent magnet 42*a* attracts the S pole created by the operating electromagnet, thereby bringing the movable member 45 into the open state.

With the fourth embodiment, since a great operating force can be obtained all over the stroke as shown in FIG. 18, the operating apparatus of the present invention can be applied to a gas insulating switching device which has a long stroke and requires to create a force, opposing the force of compressed gas in the middle of the stroke.

Fifth Embodiment

Figures 19A, 19B, 19C:
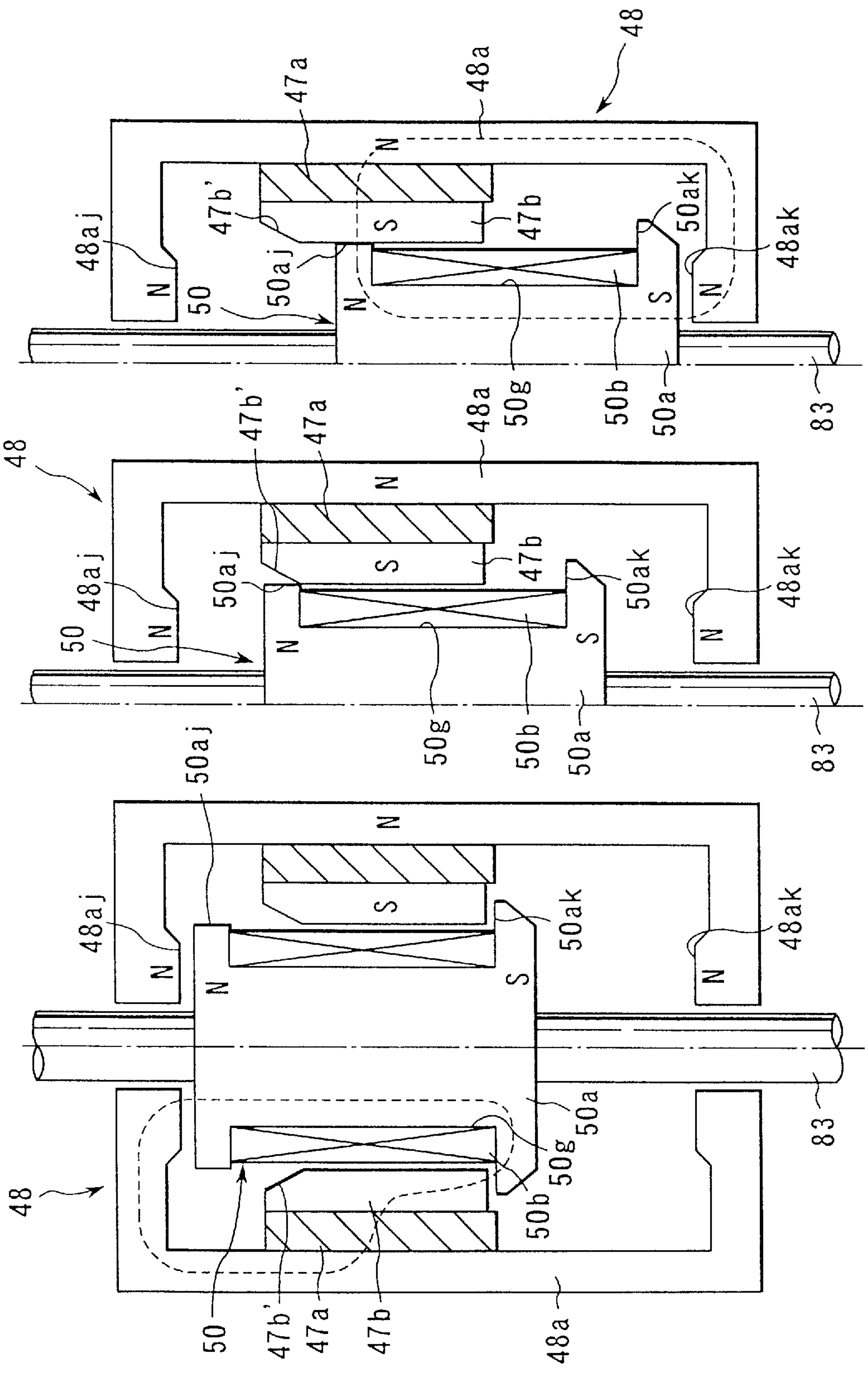
FIGS. 19A to 19C show the basic configuration of a magnetic circuit according to a fifth embodiment of the present invention.

FIGS. 19A to 19C show the basic configuration of a magnetic circuit in an operating apparatus for a switching device according to a fifth embodiment of the present invention. FIG. 19A shows a state where the switching device is closed and FIGS. 19B and 19C show a state where the switching device is open. The fifth embodiment has the same configuration as that of the third embodiment except that a magnetic circuit 48 acts as both the closing magnetic circuit 30 and the opening magnetic circuit 31.

As shown in the figure, the magnetic circuit 48 comprises a cylindrical first magnetic material 48*a*, a cylindrical permanent magnet 47*a*, and a cylindrical second magnetic material 47*b*. The first magnetic material 48*a* has an attracting surface 48*ak* lifting inward in parts through which the upper part and lower part of an operating apparatus shaft 83 are penetrated. The permanent magnet 47*a* is provided almost in the middle of the inner surface of a magnetic material 48*a*. The outer surface and inner surface of the magnet 47*a* are magnetized so that they have the N pole and S pole, respectively. The second magnetic material 47*b* is provided on the inner surface of the permanent magnet 47*a* and has an edge section 47*b*' with beveled corners at one end (the top end) in the direction of shaft on the inner surface side.

A cylindrical attracting surface 50*ak* with a nearly trapezoidal cross section at one end in the direction of shaft is provided on the outer surface of the operating apparatus shaft 83 and inside the magnetic material 47*a*. In the middle in the direction of shaft, a cylindrical iron core 50*a* with a winding housing section 50*g* is provided. In the winding housing section 50*g*. a closing operating electromagnet winding 50*b* is provided.

In the magnetic circuit 48 in the figure, the S pole is designed to attract the movable member 50 in the middle of the movable range of the operating electromagnet composed of the iron core 50*a* and operating electromagnet winding 50*b*, that is, the movable member 50. In the closed state of FIG. 19A, in the magnetic circuit 48, the attracting surfaces 48*aj*, 48*ak* attract the movable member. The attracting surfaces 50*aj*, 50*ak* extend outward more than the outer diameter of the operating electromagnetic winding 50*b* so as to allow the flux to pass through without leakage.

In a position closer to the open state in FIG. 19B, the magnetic circuit 48 is so constructed that the attracting surface 48*aj* is still away from the movable member and the edge section 47*b*' of the S pole of the magnetic material 47*b* attracts the attracting surface 50*aj*.

In the open state in FIG. 19C, the magnetic circuit 48 is so constructed that the attracting surface 48*ak* attracts the movable member and the attracting surface 50*ak* allows the flux to pass through without leakage.

In the magnetic circuit 48, the attracting surfaces 48*aj* and 50*ak* are placed in staggered fashion and similarly the attracting surfaces 48*ak* and 50*aj* are placed in staggered fashion. Between these attracting surfaces, the operating electromagnet composed of the operating electromagnet winding 50*b* and iron core 50*a*, or the movable member 50, is arranged.

Next, the operation of the fifth embodiment will be explained by reference to FIGS. 19A to 20. Reference symbols A to C in FIG. 20 indicate the points in time of the states shown in FIGS. 19A to 19C.

The S pole created at the edge section 47*b*' by the S pole of the permanent magnet 47*a* in FIGS. 19A to 19C exerts a sufficient force on the movable member 50 even in the middle of the movable range of the movable member 50, enabling the switching device with a long stroke to be opened and closed without stopping because of a load applied in the middle of operation.

Figure 20:
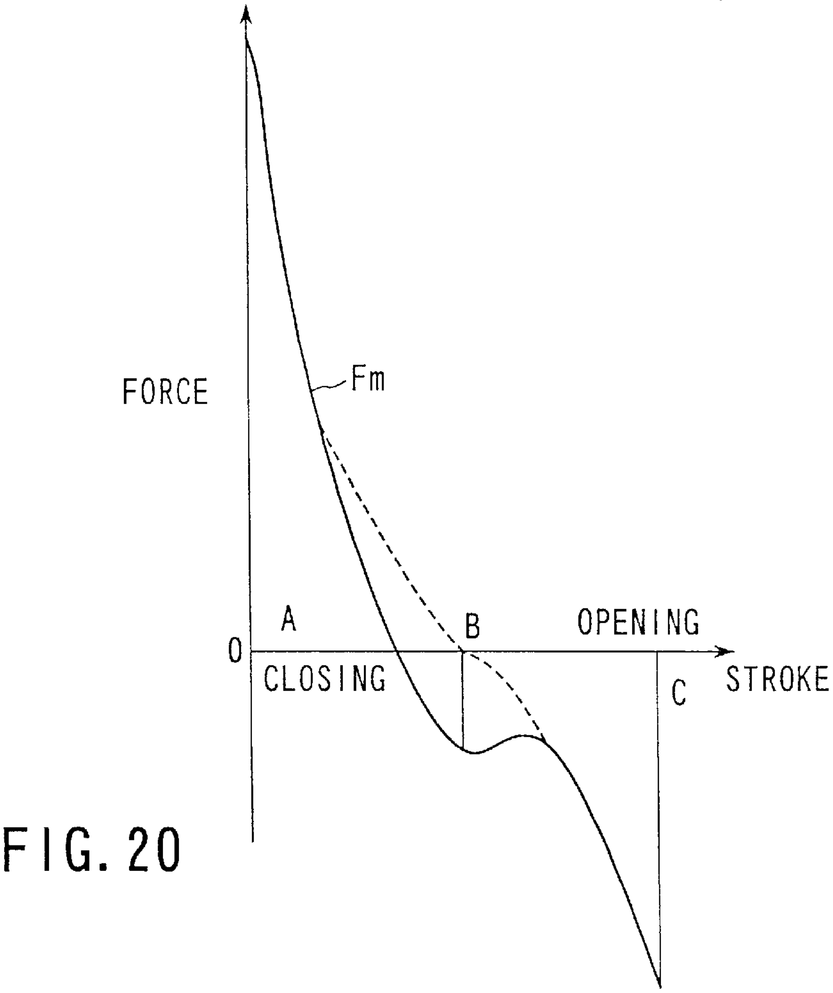
FIG. 20 shows the relationship between the stroke of the movable unit and the force applied to the unit in the fifth embodiment of FIGS. 19A to 19C.

As shown in FIG. 20, the magnetic force Fm created by the edge section 47*b*' has an upheaval in the middle of the stroke and presents a higher value all over the stroke than when there is no edge section (broken line). The magnetic force created by the operating electro-magnet is caused to repel and attract the magnetic force Fm, thereby producing an operating force all over the stroke.

In the closed state in FIG. 19A, when the operating electromagnet winding 50*b* carries no current, the attracting surface 48*ak* and the attracting surface 50*ak* at one end of the iron core 50*a* in the direction of shaft attract the movable member with great force. When current is caused to flow through the operating electromagnet winding 50*b* in the closed state of FIG. 19A, the N pole created by the permanent magnet 47*a* repels, at the attracting surface 48*ak*, the N pole created by the operating electromagnet winding 50*b* and the S pole created by the permanent magnet 47*a* repels, at the attracting surface 50*ak*, the S pole created by the operating electromagnet winding 50*b*, thereby moving the movable member 50 downward in the figure.

As a result, the force of repulsion acting between the attracting surface 48*ak* and the attracting surface 50*ak* decreases gradually. Then, in a position closer to the open state in FIG. 19B, at the attracting surface 50*ak*, the S pole created by the permanent magnet 47*a* attracts the N pole created by the operating electromagnet, thereby pulling the movable member 50 downward in the figure.

In the open state of FIG. 19C, at the attracting surface 49*ak*, the N pole created by the permanent magnet 49*a* attracts the S pole created by the operating electromagnet winding 50*b*, thereby bringing the movable member 50 into the open state.

With the fifth embodiment, since a great operating force can be obtained all over the stroke as shown in FIG. 20 and a large holding force is generated in the closed state, the operating apparatus 46 of the present invention can be applied to a vacuum switching device with a large vacuum valve which has a long stroke and requires a great spring pressing force in closing.

While in FIGS. 17A to 17D and FIGS. 19A to 19C, a container housing the magnetic circuits 48, 48 has not been shown, a container composed of, for example, a circular cylinder 25*a* and lids 25*b*, 25*c* as shown in FIG. 15 or 16 may be provided.

As described above, with the present invention, it is possible to provide an operating apparatus for a switching device which not only operates stably obtaining a large contact load with a simple mechanism but also enables a long-stroke operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An operating apparatus for operating a switching device having a movable contact and a fixed contact so provided that they can contact each other and separate from each other, comprising:

an operating rod which is fixed to said movable contact and is held such that the rod can move in a direction in which said movable contact makes into contact with or is separated from said fixed contact;

a movable member which is connected to the operating rod such that the member can move relatively to the rod and the relative movement to said operating rod is limited to a specific movable range;

fixed member for holding said movable member such that the movable member can move;

a first elastic member for acting said operating rod with respect to said movable member in the direction in which said movable contact is pressed against said fixed contact;

a permanent magnet for attracting said movable member with respect to said fixed member;

a closing magnetic circuit so constructed that, when said movable contact is in contact with said fixed contact and the switching device is closed, N and S poles of said permanent magnet attract said movable member in the direction in which said movable contact is pressed against said fixed contact;

an opening magnetic circuit so constructed that, when said movable contact is apart from said fixed contact and the switching device is open, at least one of the N and S poles of said permanent magnet attract said movable member in the direction in which said movable contact is separated from said fixed contact; and an operating electromagnet for increasing and decreasing the magnetism in said closing magnetic circuit and said opening magnetic circuit.

2. The apparatus according to claim 1, further comprising a second elastic member for acting said movable member with respect to said fixed member in the direction in which said movable contact is separated from said fixed contact.

3. The apparatus according to claim 2, further comprising a third elastic member for acting said movable member with respect to said fixed member in the direction in which said movable contact is pressed against said fixed contact in an open position where said movable contact is apart from said fixed contact.

4. The apparatus according to claim 2, wherein, if a reaction force that said operating rod exerts on said movable member by the action of said first elastic member is Fk1, a reaction force that said fixed member exerts on said movable member by the action of said second elastic member is Fk2, and said permanent-magnet-generated attracting force that said fixed member acts on said movable member is Fm, setting is done in the movable range of said movable member such that the changing characteristic of Fk, or Fk1+Fk2, is almost equal to the changing characteristic of Fm.

5. The apparatus according to claim 3, wherein, if a reaction force that said operating rod exerts on said movable member by the action of said first elastic member is Fk1, a reaction force that said fixed member exerts on said movable member by the action of said second elastic member is Fk2, a reaction force that said fixed member exerts on said movable member by the action of said third elastic member is Fk3, and said permanent-magnet-generated attracting force that said fixed member acts on said movable member is Fm, setting is done in the movable range of said movable member such that the changing characteristic of Fk, or Fk1+Fk2+Fk3, is almost equal to the changing characteristic of Fm.

6. The apparatus according to claim 4, wherein setting is done such that, when said movable contact is pressed against said fixed contact and said switching device is closed, an expression Fk<Fm holds, and when said switching device is open, an expression Fk>Fm holds.

7. The apparatus according to claim 5, wherein setting is done such that, when said movable contact is pressed against said fixed contact and said switching device is closed, an expression Fk<Fm holds, and when said switching device is open, an expression Fk>Fm holds.

8. The apparatus according to claim 1, wherein said operating electromagnet is composed of a closing operating electromagnet located in said closing magnetic circuit and an opening operating electromagnet located in said opening magnetic circuit.

9. The apparatus according to claim 2, further comprising:

a peep door which is provided in part of said opening magnetic circuit or said closing magnetic circuit, can be opened and closed freely, and allows the N and S magnetic poles of said permanent magnet to be peeped at; and a magnetic force short member which has such a size as can be inserted through said peed door and pressed against the N and S poles and is made of a permeability material.

10. The apparatus according to claim 9, wherein said peed door also serves as said magnetic force short member.

11. The apparatus according to claim 1, wherein said opening magnetic circuit is so constructed that, when said movable contact is apart from said fixed contact and said switching device is open, the N and S poles of said permanent magnet attract said fixed member in the direction in which said movable contact is separated from said fixed contact.

12. The apparatus according to claim 11, further comprising:

a second elastic member for acting said movable member with respect to said fixed member in the direction in which said movable contact is separated from said fixed contact; and a third elastic member for acting said movable member with respect to said fixed member in the direction in which said movable contact is pressed against said fixed contact.

13. The apparatus according to claim 12, wherein, if a reaction force that said operating rod exerts on said movable member by the action of said first elastic member is Fk1, a reaction force that said fixed member exerts on said movable member by the action of said second elastic member is Fk2, a reaction force that said fixed member exerts on said movable member by the action of said third elastic member is Fk3, and said permanent-magnet-generated attracting force that said fixed member acts on said movable member is Fm, setting is done in the movable range of said movable member such that the changing characteristic of Fk, or Fk1+Fk2+Fk3, is almost equal to the changing characteristic of Fm.

14. The apparatus according to claim 11, wherein one of the N and S poles of said permanent magnet is a part to increase a force of attraction or a force of repulsion so as to accelerate said movable member in a direction of motion in the movable range of said movable member.

15. The apparatus according to claim 13, wherein setting is done such that, when said movable contact is pressed against said fixed contact and said switching device is closed, an expression Fk<Fm holds, and when said switching device is open, an expression Fk>Fm holds.

16. The apparatus according to claim 1, wherein attracting surfaces of the N and S poles of said closing magnetic circuit and said opening magnetic circuit are placed in staggered fashion in the direction in which said movable member moves.

17. The apparatus according to claim 16, wherein a distance by which attracting surfaces of said N and S poles are staggered is longer than or almost equal to a stroke in which said movable member moves.

18. The apparatus according to claim 1, wherein said closing magnetic circuit and/or said opening magnetic circuit are so constructed that areas of attracting surfaces of the N and S poles are nearly equal.

19. The apparatus according to claim 1, wherein a density of magnetic flux created by said permanent magnet is designed to come closer to a magnetic saturation staring point of a material at attracting surfaces of said closing magnetic circuit and/or said opening magnetic circuit in a state where the attracting surfaces has approached said fixed member.

* * * * *